US012761655B2

(12) United States Patent
Choi et al.

(10) Patent No.: US 12,761,655 B2
(45) Date of Patent: Oct. 13, 2026

(54) REMOTELY ENGAGING AUTONOMOUS VEHICLES

(71) Applicant: Aurora Operations, Inc., Pittsburgh, PA (US)

(72) Inventors: Woosung Choi, San Mateo, CA (US); Archana Iyer, Pittsburgh, PA (US); Maitreya Jayesh Naik, Pittsburgh, PA (US); Aaron Paul Siri, Pittsburgh, PA (US); Graeme Carleton Smith, New York, NY (US); Todd Tsui, Woodinville, WA (US); Matthew Charles Ellis Wood, Pittsburgh, PA (US); Liang Chao Zhao, San Jose, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 0 days.

(21) Appl. No.: 18/934,650

(22) Filed: Nov. 1, 2024

(65) Prior Publication Data

US 2026/0126792 A1 May 7, 2026

(51) Int. Cl.
*G05D 1/222* (2024.01)
*G05D 1/246* (2024.01)
(Continued)

(52) U.S. Cl.
CPC ............. *G05D 1/222* (2024.01); *G05D 1/246* (2024.01); *G06F 21/31* (2013.01); *G05D 2103/00* (2024.01); *G05D 2109/10* (2024.01)

(58) Field of Classification Search
CPC .... G05D 1/222; G05D 1/246; G05D 2103/00; G05D 2109/10; G06F 21/31
(Continued)

(56) References Cited

U.S. PATENT DOCUMENTS 11,753,040 B1 * 9/2023 Gammelgard ......... G05D 1/646 701/2
2022/0185315 A1 * 6/2022 Falk ..................... G06Q 10/025
(Continued)

OTHER PUBLICATIONS

Nthatisi Hlapisi, Understanding Security Keys in Bluetooth Low Energy, Aug. 13, 2023, All About Circuits, pp. 1-7.*
(Continued)

*Primary Examiner* — Andrew R Dyer
(74) *Attorney, Agent, or Firm* — Dority & Manning, P.A.

(57) ABSTRACT

An example method includes receiving a request to initiate a computer-controlled operational state of the autonomous vehicle. The example method includes verifying, using a cryptographically signed identifier, an identity of the autonomous vehicle and an authorization status associated with the autonomous vehicle. The example method includes verifying that a control subsystem of the autonomous vehicle is configured to execute the software version and that a map subsystem of the autonomous vehicle is configured to execute the map version. The example method includes verifying that one or more environmental conditions associated with the route for execution by the autonomous vehicle satisfy criteria. The example method includes receiving, from a human-machine interface device, a launch signal input. The example method includes transmitting, responsive to the launch signal input and conditioned on successfully verifying the identity and the authorization status, a launch signal to the autonomous vehicle to initiate execution of the route.

27 Claims, 17 Drawing Sheets

(51) Int. Cl.
*G06F 21/31* (2013.01)
*G05D 103/00* (2024.01)
*G05D 109/10* (2024.01)

(58) Field of Classification Search
USPC .............................................................. 701/2
See application file for complete search history.

(56) References Cited

U.S. PATENT DOCUMENTS

| | | | | |
|---|---|---|---|---|
| 2022/0413510 | A1* | 12/2022 | Zhao | G01C 21/3811 |
| 2023/0177618 | A1* | 6/2023 | Floyd | G05D 1/0214<br>705/4 |
| 2023/0281528 | A1* | 9/2023 | Hayashi | G06Q 10/06312<br>705/7.22 |
| 2024/0094721 | A1* | 3/2024 | Kubie | B64C 39/024 |
| 2024/0143705 | A1* | 5/2024 | MacGregor | G05D 1/2272 |
| 2024/0219537 | A1* | 7/2024 | Charles | G01S 17/931 |
| 2024/0310851 | A1* | 9/2024 | Ebrahimi Afrouzi | G01S 17/87 |
| 2024/0314058 | A1* | 9/2024 | Mueck | H04L 41/40 |

OTHER PUBLICATIONS

Deepa Kalani, U.S. Appl. No. 19/397,398, filed Nov. 21, 2025, Remotely Authorizing Autonomy State Changes of an Autonomous Vehicie.

Deepa Kalani, U.S. Appl. No. 19/397,390, filed Nov. 21, 2025, Authorization for Redundant Autonomous Vehicle Control Systems.

* cited by examiner

FIG. 3C
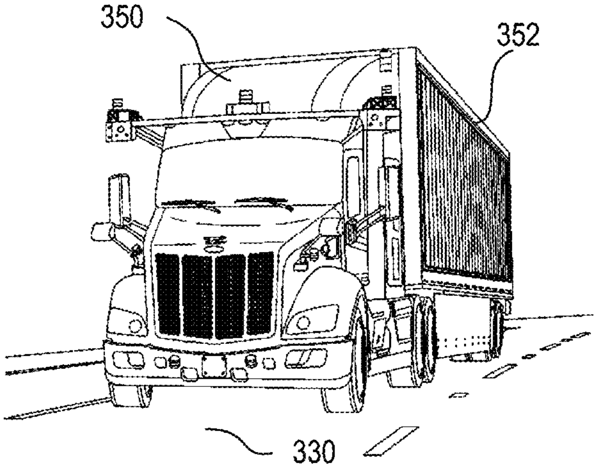
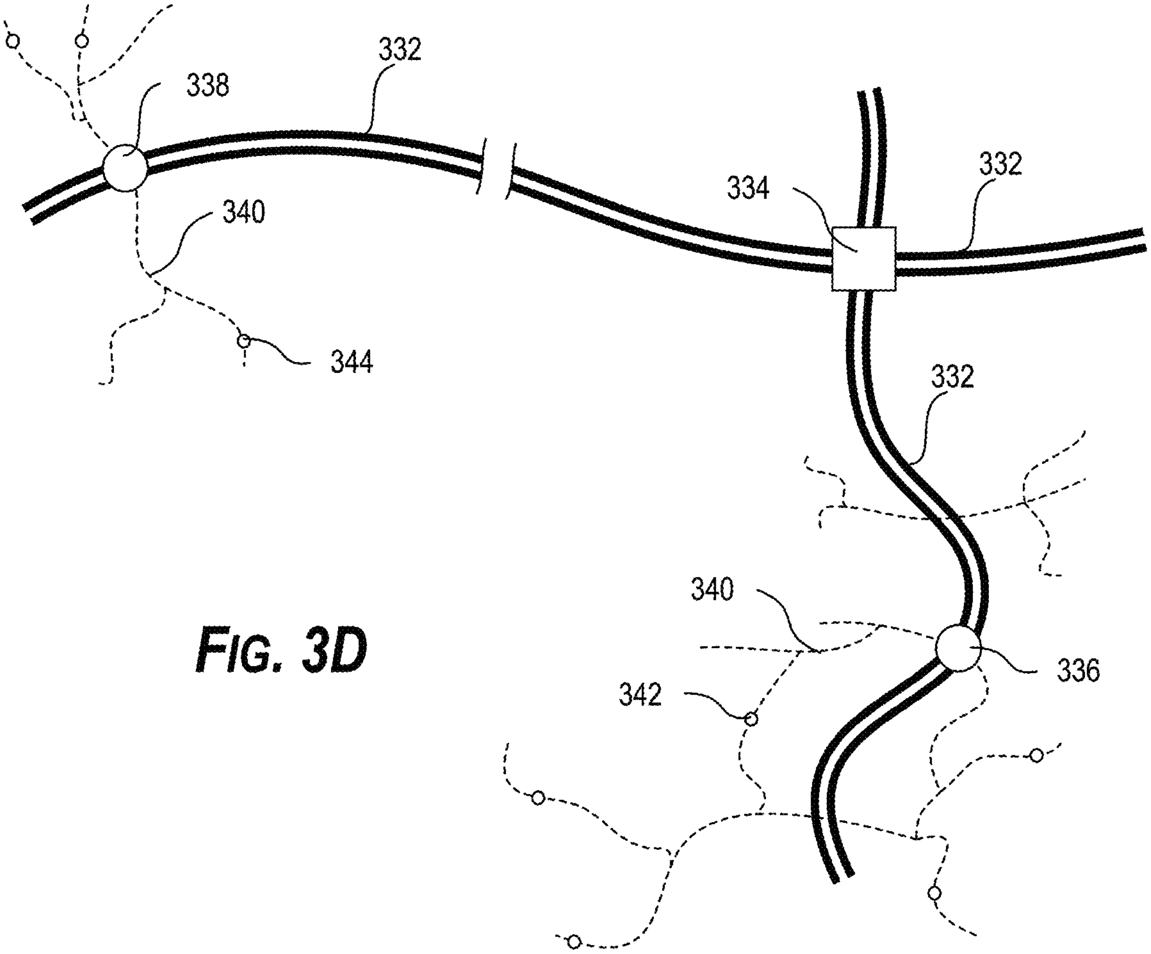
FIG. 3D

REMOTELY ENGAGING AUTONOMOUS VEHICLES

BACKGROUND

An autonomous platform can process data to perceive an environment through which the autonomous platform travels. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Example implementations of the present disclosure provide a robust framework for remotely facilitating operational state changes of an autonomous vehicle. As autonomous vehicles are incorporated into scalable transportation networks, traditional ad-hoc manual launch procedures used during research and development stages will be a significant bottleneck for smooth, reliable use of autonomous vehicles at scale. The present disclosure provides computing systems and techniques that can communicate between operator devices and vehicle systems to confirm vehicle readiness, verify vehicle instructions, and initiate control handover into automated drive modes for improved system efficiency.

In an example, a verification system can receive a request to deploy or launch a vehicle. A launch can include changing an operational state for a vehicle from a "standby" or a "manual control" mode into a computer-controlled operational state in which the vehicle can autonomously navigate through its environment. The request can be a request generated responsive to an input on a human-machine interface or a request generated based on a schedule for vehicle deployment. This request can initiate a sequence of verifications that help confirm that vehicle systems are up to date, operational, and have access to valid instruction sets for the upcoming journey (e.g., route, etc.).

An example verification includes verifying an identity of the autonomous vehicle subject to the launch request. This verification operation can help ensure that the vehicle that is launched is the vehicle that an operator or system expects to launch. This can help avoid surprise movements from autonomous vehicles. The verification operation can include receiving a cryptographically signed identifier from the vehicle and comparing the identifier with an allowlist of vehicles that are approved for launch. The verification operation can include using additional modalities of confirmation (e.g., a button press on the subject vehicle contemporaneously with the launch initiation, an image capture of the subject vehicle, etc.).

An example verification includes verifying an autonomous control system of the autonomous vehicle. This verification operation can include evaluating software versions, file checksums, sensor status values, calibration results, etc. to determine a system readiness for the desired journey. Cryptographic signatures associated with the system components can provide evidence of system integrity and verify a source of the software components. Some components can be permanently marked (e.g., physically or digitally) with a component identifier that can help demonstrate a lack of tampering, unauthorized repair/replacement, etc.

An example verification includes verifying a route for execution by the autonomous vehicle. For example, in some contexts an autonomous vehicle can be launched to traverse a particular route from an origin to a destination. This route can be loaded into memory of the autonomous vehicle during or prior to launch. The stored route can be verified for data integrity to confirm that the transfer was performed correctly. The route can be verified by evaluating the route against one or more operational constraints of the autonomous vehicle. For example, the operational requirements of traversing a given route can vary over time. Traversing a route in low traffic on a clear day at noon can require different operational capacities as compared to traversing the same route at night in the rain in heavy traffic. Verifying the route can include determining one or more environmental factors (e.g., weather, traffic, road condition, internal or external bulletins, etc.) and determining that the autonomous vehicle can execute the route using the autonomous control system while satisfying one or more operational constraints of the autonomous vehicle.

Based on these verifications, a verification system can clear the autonomous vehicle for launch. Once fully verified, the verification system can initiate launch of the vehicle by outputting a launch signal to the autonomous vehicle. The launch signal can be issued responsive to a launch signal input. The launch signal input can correspond to a button press or other physical engagement with a control surface. The launch signal input can originate from a control terminal external to the autonomous vehicle (e.g., a control terminal spaced apart from a launch location of the autonomous vehicle).

Example implementations of an example verification system according to aspects of the present disclosure can provide a number of improvements to autonomous vehicles and autonomous fleet control systems. For example, an example verification system can provide for remote engagement and launch of autonomous vehicles while offering robust verification of operational readiness. As compared to prior manual techniques, this automated and integrated approach can improve consistency, increase reliability, and decrease time to deploy a vehicle. Furthermore, by facilitating remote engagement of a vehicle, an example verification system can provide for increased buffer zones between active autonomous vehicles and human operators/launch personnel. For example, one or multiple interactions can confirm vehicle and operator readiness before launch is initiated to avoid any surprise movements. For example, physically distinct launch control interfaces that are spaced apart from a designated launch area can induce physical distance between launch personnel and the vehicle that is being launched. In some implementations, additional authentication procedures at time of launch can decrease a likelihood of inadvertent or unauthorized launch.

An additional example advantage includes increased physical and cyber security of autonomous vehicles and autonomous vehicle computing systems. By providing a launch verification system with one or more authentication challenges, an example verification system according to aspects of the present disclosure can help ensure that the intended vehicles are launched only when authorized to do so. For instance, an example verification system can authenticate the vehicle to determine that the correct vehicle is being instructed for launch. An example verification system can authenticate a source of a launch signal (e.g., a user device, a scheduling system, etc.) to determine that the instructions are received from a verified source with authority to launch a vehicle. One or more of these authentications can be multi-factor. One or more of these authentications can integrate with platform-level authentication and identification servers that can allow centralized control and management of access tokens. As compared to prior ad-hoc launch approaches, example implementations of the present disclosure are more resistant to unauthorized access and more amenable to enterprise-level maintenance and control.

In this manner, for example, example implementations of the present disclosure improve autonomous vehicles by providing a framework for new types of more robust control interfaces that allow for secure system integration in previously unrealized capacities. Further, example implementations of the present disclosure improve the field of autonomous transport as a whole by unlocking scalable fleet deployments of autonomous vehicles in a repeatable, auditable, and adaptable manner.

For example, in an aspect, the present disclosure provides an example method for initiating an operational state change of an autonomous vehicle to cause the autonomous vehicle to launch a mission. In some implementations, the example method includes (a) r receiving a request to initiate a computer-controlled operational state of the autonomous vehicle, the request comprising an operational profile identifying (i) the autonomous vehicle, (ii) a route for execution by the autonomous vehicle, (iii) an expected software version, and (iv) an expected map version. In some implementations, the example method includes (b) verifying, using a cryptographically signed identifier, an identity of the autonomous vehicle and an authorization status associated with the autonomous vehicle. In some implementations, the example method includes (c) verifying that a control subsystem of the autonomous vehicle is configured to execute the expected software version and that a map subsystem of the autonomous vehicle is configured to execute the expected map version. In some implementations, the example method includes (d) verifying that one or more environmental conditions associated with the route for execution by the autonomous vehicle satisfy one or more criteria. In some implementations, the example method includes (e) receiving, from a human-machine interface device, a launch signal input. In some implementations, the example method includes (f) transmitting a launch signal to the autonomous vehicle to initiate execution of the route, wherein the launch signal is output responsive to the launch signal input and conditioned on successfully verifying the identity and the authorization status and verifying (b)-(d).

In an aspect, the present disclosure provides an example one or more non-transitory computer-readable media storing instructions that are executable by one or more processors to cause a computing system to perform operations for initiating an operational state change of an autonomous vehicle to cause the autonomous vehicle to launch a mission. In the example one or more non-transitory computer-readable media, the operations include any one or multiple of the implementations of the example method.

In an aspect, the present disclosure provides an example computing system. The example computing system includes one or more processors. The example computing system includes one or more non-transitory computer-readable media storing instructions that are executable by the one or more processors to cause the computing system to perform operations for initiating an operational state change of an autonomous vehicle to cause the autonomous vehicle to launch a mission. In the example computing system, the operations include any one or multiple of the implementations of the example method.

Other example aspects of the present disclosure are directed to other systems, methods, vehicles, apparatuses, tangible non-transitory computer-readable media, and devices for performing functions described herein. These and other features, aspects and advantages of various implementations will become better understood with reference to the following description and appended claims.

BRIEF DESCRIPTION OF THE DRAWINGS

The accompanying drawings, which are incorporated in and constitute a part of this specification, illustrate implementations of the present disclosure and, together with the description, serve to explain the related principles.

FIG. 3C is a representation of an example operational environment, according to some implementations of the present disclosure.

FIG. 3D is a representation of an example map of an operational environment, according to some implementations of the present disclosure.

DETAILED DESCRIPTION

The following describes the technology of this disclosure within the context of an autonomous vehicle for example purposes only. As described herein, the technology described herein is not limited to an autonomous vehicle and can be implemented for or within other autonomous platforms and other computing systems.

Figure 1:
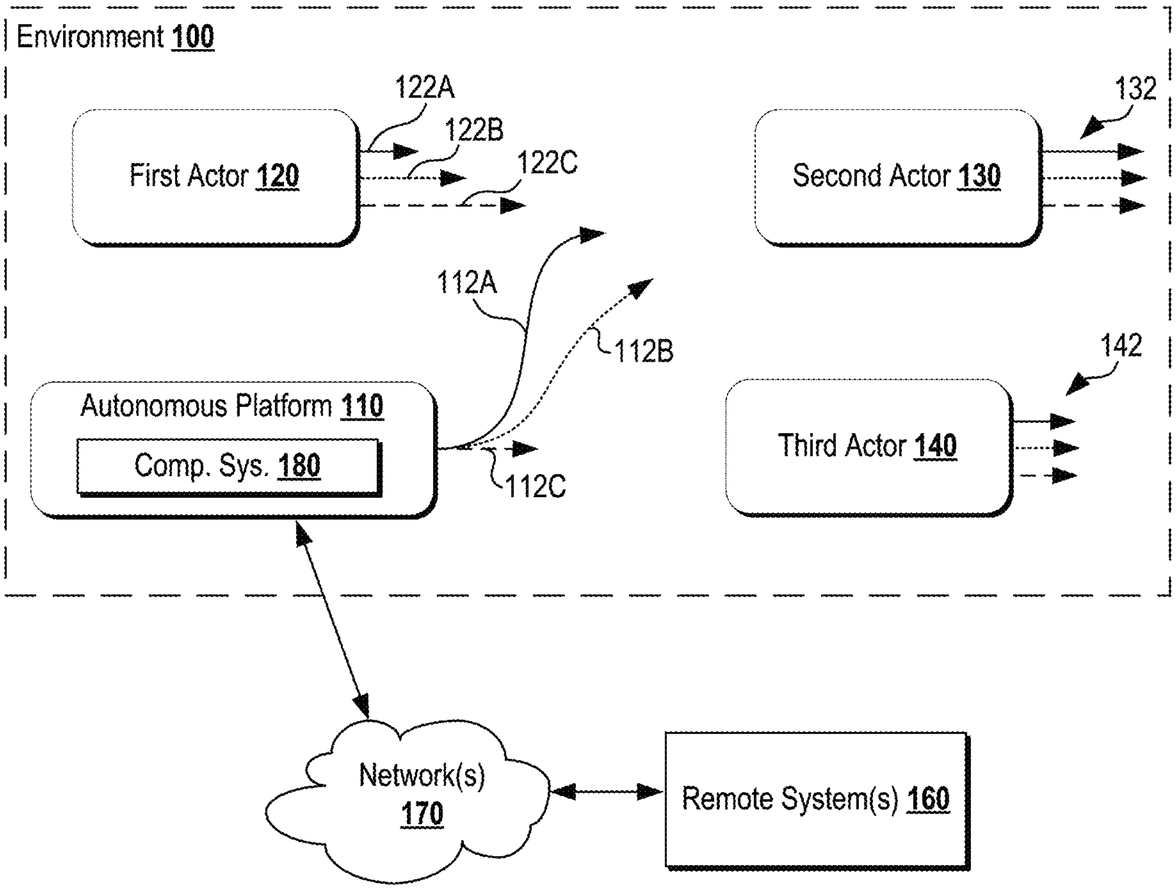
FIG. 1 is a block diagram of an example operational scenario, according to some implementations of the present disclosure.

With reference to FIG. 1-16, example implementations of the present disclosure are discussed in further detail. FIG. 1 is a block diagram of an example operational scenario, according to some implementations of the present disclosure. In the example operational scenario, an environment 100 contains an autonomous platform 110 and a number of objects, including first actor 120, second actor 130, and third actor 140. In the example operational scenario, the autonomous platform 110 can move through the environment 100 and interact with the object(s) that are located within the environment 100 (e.g., first actor 120, second actor 130, third actor 140, etc.). The autonomous platform 110 can optionally be configured to communicate with remote system(s) 160 through network(s) 170.

The environment 100 may be or include an indoor environment (e.g., within one or more facilities, etc.) or an outdoor environment. An indoor environment, for example, may be an environment enclosed by a structure such as a building (e.g., a service depot, maintenance location, manufacturing facility, etc.). An outdoor environment, for example, may be one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), or other outdoor environments.

The autonomous platform 110 may be any type of platform configured to operate within the environment 100. For example, the autonomous platform 110 may be a vehicle configured to autonomously perceive and operate within the environment 100. The vehicles may be a ground-based autonomous vehicle such as, for example, an autonomous car, truck, van, etc. The autonomous platform 110 may be an autonomous vehicle that can control, be connected to, or be otherwise associated with implements, attachments, and/or accessories for transporting people or cargo. This can include, for example, an autonomous tractor optionally coupled to a cargo trailer. Additionally, or alternatively, the autonomous platform 110 may be any other type of vehicle such as one or more aerial vehicles, water-based vehicles, space-based vehicles, other ground-based vehicles, etc.

The autonomous platform 110 may be configured to communicate with the remote system(s) 160. For instance, the remote system(s) 160 can communicate with the autonomous platform 110 for assistance (e.g., navigation assistance, situation response assistance, etc.), control (e.g., fleet management, remote operation, etc.), maintenance (e.g., updates, monitoring, etc.), or other local or remote tasks. In some implementations, the remote system(s) 160 can provide data indicating tasks that the autonomous platform 110 should perform. For example, as further described herein, the remote system(s) 160 can provide data indicating that the autonomous platform 110 is to perform a trip/service such as a user transportation trip/service, delivery trip/service (e.g., for cargo, freight, items), etc.

The autonomous platform 110 can communicate with the remote system(s) 160 using the network(s) 170. The network(s) 170 can facilitate the transmission of signals (e.g., electronic signals, etc.) or data (e.g., data from a computing device, etc.) and can include any combination of various wired (e.g., twisted pair cable, etc.) or wireless communication mechanisms (e.g., cellular, wireless, satellite, microwave, radio frequency, etc.) or any desired network topology (or topologies). For example, the network(s) 170 can include a local area network (e.g., intranet, etc.), a wide area network (e.g., the Internet, etc.), a wireless LAN network (e.g., through Wi-Fi, etc.), a cellular network, a SATCOM network, a VHF network, a HF network, a WiMAX based network, or any other suitable communications network (or combination thereof) for transmitting data to or from the autonomous platform 110.

As shown for example in FIG. 1, environment 100 can include one or more objects. The object(s) may be objects not in motion or not predicted to move ("static objects") or object(s) in motion or predicted to be in motion ("dynamic objects" or "actors"). In some implementations, the environment 100 can include any number of actor(s) such as, for example, one or more pedestrians, animals, vehicles, etc. The actor(s) can move within the environment according to one or more actor trajectories. For instance, the first actor 120 can move along any one of the first actor trajectories 122A-C, the second actor 130 can move along any one of the second actor trajectories 132, the third actor 140 can move along any one of the third actor trajectories 142, etc.

As further described herein, the autonomous platform 110 can utilize its autonomy system(s) to detect these actors (and their movement) and plan its motion to navigate through the environment 100 according to one or more platform trajectories 112A-C. The autonomous platform 110 can include onboard computing system(s) 180. The onboard computing system(s) 180 can include one or more processors and one or more memory devices. The one or more memory devices can store instructions executable by the one or more processors to cause the one or more processors to perform operations or functions associated with the autonomous platform 110, including implementing its autonomy system(s).

Figure 2:
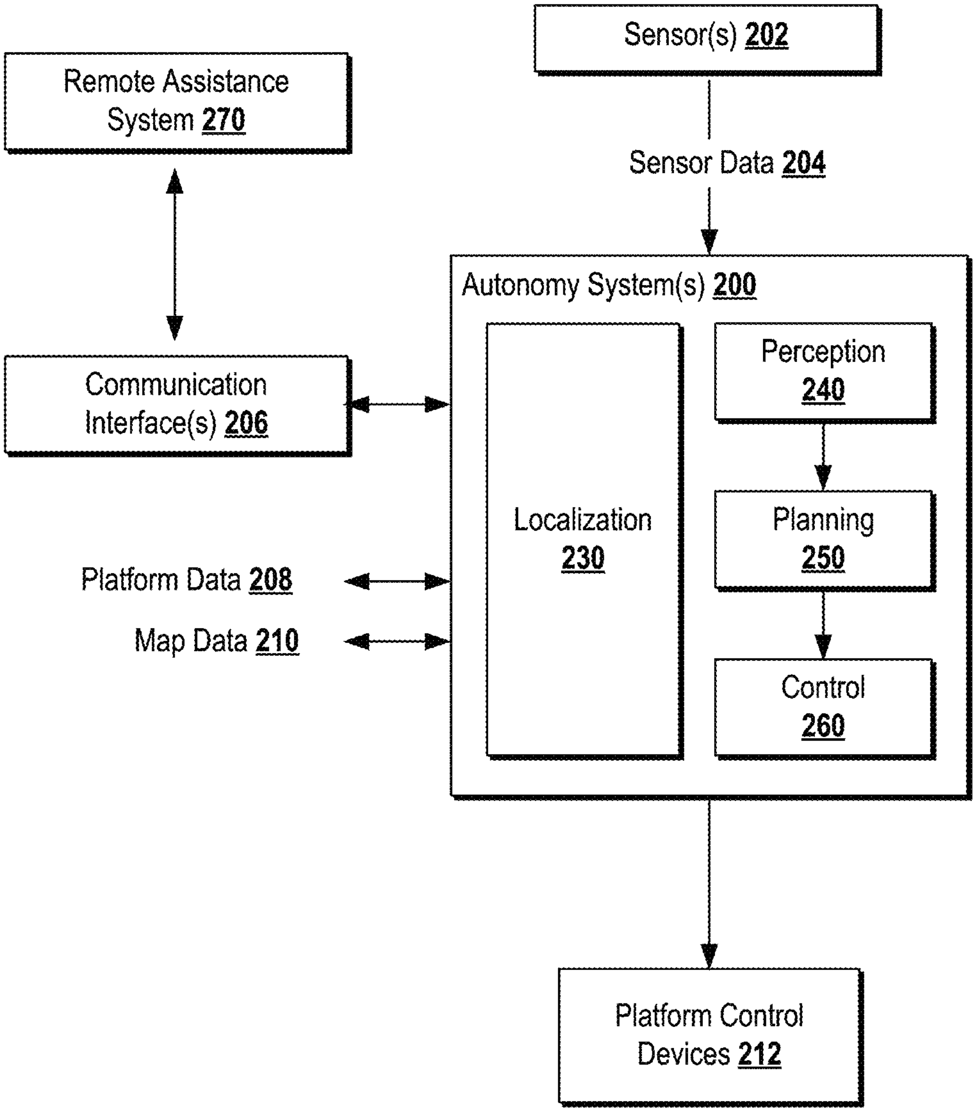
FIG. 2 is a block diagram of an example system, according to some implementations of the present disclosure.

FIG. 2 is a block diagram of an example autonomy system 200 for an autonomous platform, according to some implementations of the present disclosure. In some implementations, the autonomy system 200 can be implemented by a computing system of the autonomous platform (e.g., the onboard computing system(s) 180 of the autonomous platform 110). The autonomy system 200 can operate to obtain inputs from sensor(s) 202 or other input devices. In some implementations, the autonomy system 200 can additionally obtain platform data 208 (e.g., map data 210) from local or remote storage. The autonomy system 200 can generate control outputs for controlling the autonomous platform (e.g., through platform control devices 212, etc.) based on sensor data 204, map data 210, or other data. The autonomy system 200 may include different subsystems for performing various autonomy operations. The subsystems may include a localization system 230, a perception system 240, a planning system 250, and a control system 260. The localization system 230 can determine the location of the autonomous platform within its environment; the perception system 240 can detect, classify, and track objects and actors in the environment; the planning system 250 can determine a trajectory for the autonomous platform; and the control system 260 can translate the trajectory into vehicle controls for controlling the autonomous platform. The autonomy system 200 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the autonomy system 200 can be shared among its subsystems, or a subsystem can have a set of dedicated computing resources.

In some implementations, the autonomy system 200 can be implemented for or by an autonomous vehicle (e.g., a ground-based autonomous vehicle). The autonomy system 200 can perform various processing techniques on inputs (e.g., the sensor data 204, the map data 210) to perceive and understand the vehicle's surrounding environment and generate an appropriate set of control outputs to implement a vehicle motion plan (e.g., including one or more trajectories) for traversing the vehicle's surrounding environment (e.g., environment 100 of FIG. 1, etc.). In some implementations, an autonomous vehicle implementing the autonomy system 200 can drive, navigate, operate, etc. with minimal or no interaction from a human operator (e.g., driver, pilot, etc.).

In some implementations, the autonomous platform can be configured to operate in a plurality of operating modes. For instance, the autonomous platform can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous platform can operate in a semi-autonomous operating mode in which the autonomous platform can operate with some input from a human operator present in the autonomous platform (or a human operator that is remote from the autonomous platform). In some implementations, the autonomous platform can enter into a manual operating mode in which the autonomous platform is fully controllable by a human operator (e.g., human driver, etc.) and can be prohibited or disabled (e.g., temporary, permanently, etc.) from performing autonomous navigation (e.g., autonomous driving, etc.). The autonomous platform can be configured to operate in other modes such as, for example, park or sleep modes (e.g., for use between tasks such as waiting to provide a trip/service, recharging, etc.). In some implementations, the autonomous platform can implement vehicle operating assistance technology (e.g., collision mitigation system, power assist steering, etc.), for example, to help assist the human operator of the autonomous platform (e.g., while in a manual mode, etc.).

Autonomy system 200 can be located onboard (e.g., on or within) an autonomous platform and can be configured to operate the autonomous platform in various environments. The environment may be a real-world environment or a simulated environment. In some implementations, one or more simulation computing devices can simulate one or more of: the sensors 202, the sensor data 204, communication interface(s) 206, the platform data 208, or the platform control devices 212 for simulating operation of the autonomy system 200.

In some implementations, the autonomy system 200 can communicate with one or more networks or other systems with the communication interface(s) 206. The communication interface(s) 206 can include any suitable components for interfacing with one or more network(s) (e.g., the network(s) 170 of FIG. 1, etc.), including, for example, transmitters, receivers, ports, controllers, antennas, or other suitable components that can help facilitate communication. In some implementations, the communication interface(s) 206 can include a plurality of components (e.g., antennas, transmitters, or receivers, etc.) that allow it to implement and utilize various communication techniques (e.g., multiple-input, multiple-output (MIMO) technology, etc.).

In some implementations, the autonomy system 200 can use the communication interface(s) 206 to communicate with one or more computing devices that are remote from the autonomous platform (e.g., the remote system(s) 160) over one or more network(s) (e.g., the network(s) 170). For instance, in some examples, one or more inputs, data, or functionalities of the autonomy system 200 can be supplemented or substituted by a remote system communicating over the communication interface(s) 206. For instance, in some implementations, the map data 210 can be downloaded over a network to a remote system using the communication interface(s) 206. In some examples, one or more of localization system 230, perception system 240, planning system 250, or control system 260 can be updated, influenced, nudged, communicated with, etc. by a remote system for assistance, maintenance, situational response override, management, etc.

The sensor(s) 202 can be located onboard the autonomous platform. In some implementations, the sensor(s) 202 can include one or more types of sensor(s). For instance, one or more sensors can include image capturing device(s) (e.g., visible spectrum cameras, infrared cameras, etc.). Additionally, or alternatively, the sensor(s) 202 can include one or more depth capturing device(s). For example, the sensor(s) 202 can include one or more Light Detection and Ranging (LIDAR) sensor(s) or Radio Detection and Ranging (RADAR) sensor(s). The sensor(s) 202 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 202 for capturing depth information can be fixed to a rotational device in order to rotate the sensor(s) 202 about an axis. The sensor(s) 202 can be rotated about the axis while capturing data in interval sector packets descriptive of different portions of a three-hundred-and-sixty-degree view of a surrounding environment of the autonomous platform. In some implementations, one or more of the sensor(s) 202 for capturing depth information can be solid state.

The sensor(s) 202 can be configured to capture the sensor data 204 indicating or otherwise being associated with at least a portion of the environment of the autonomous platform. The sensor data 204 can include image data (e.g., 2D camera data, video data, etc.), RADAR data, LIDAR data (e.g., 3D point cloud data, etc.), audio data, or other types of data. In some implementations, the autonomy system 200 can obtain input from additional types of sensors, such as inertial measurement units (IMUs), altimeters, inclinometers, odometry devices, location or positioning devices (e.g., GPS, compass), wheel encoders, or other types of sensors. In some implementations, the autonomy system 200 can obtain sensor data 204 associated with particular component(s) or system(s) of an autonomous platform. This sensor data 204 can indicate, for example, wheel speed, component temperatures, steering angle, cargo or passenger status, etc. In some implementations, the autonomy system 200 can obtain sensor data 204 associated with ambient conditions, such as environmental or weather conditions. In some implementations, the sensor data 204 can include multi-modal sensor data. The multi-modal sensor data can be obtained by at least two different types of sensor(s) (e.g., of the sensors 202) and can indicate static object(s) or actor(s) within an environment of the autonomous platform. The multi-modal sensor data can include at least two types of sensor data (e.g., camera and LIDAR data). In some implementations, the autonomous platform can utilize the sensor data 204 for sensors that are remote from (e.g., offboard) the autonomous platform. This can include for example, sensor data 204 captured by a different autonomous platform.

The autonomy system 200 can obtain the map data 210 associated with an environment in which the autonomous platform was, is, or will be located. The map data 210 can provide information about an environment or a geographic area. For example, the map data 210 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous platform in understanding its surrounding environment and its relationship thereto. In some implementations, the map data 210 can include high-definition map information. Additionally, or alternatively, the map data 210 can include sparse map data (e.g., lane graphs, etc.). In some implementations, the sensor data 204 can be fused with or used to update the map data 210 in real-time.

The autonomy system 200 can include the localization system 230, which can provide an autonomous platform with an understanding of its location and orientation in an environment. In some examples, the localization system 230 can support one or more other subsystems of the autonomy system 200, such as by providing a unified local reference frame for performing, e.g., perception operations, planning operations, or control operations.

In some implementations, the localization system 230 can determine a current position of the autonomous platform. A current position can include a global position (e.g., respecting a georeferenced anchor, etc.) or relative position (e.g., respecting objects in the environment, etc.). The localization system 230 can generally include or interface with any device or circuitry for analyzing a position or change in position of an autonomous platform (e.g., autonomous ground-based vehicle, etc.). For example, the localization system 230 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous platform can be used by various subsystems of the autonomy system 200 or provided to a remote computing system (e.g., using the communication interface(s) 206).

In some implementations, the localization system 230 can register relative positions of elements of a surrounding environment of an autonomous platform with recorded positions in the map data 210. For instance, the localization system 230 can process the sensor data 204 (e.g., LIDAR data, RADAR data, camera data, etc.) for aligning or otherwise registering to a map of the surrounding environment (e.g., from the map data 210) to understand the autonomous platform's position within that environment. Accordingly, in some implementations, the autonomous platform can identify its position within the surrounding environment (e.g., across six axes, etc.) based on a search over the map data 210. In some implementations, given an initial location, the localization system 230 can update the autonomous platform's location with incremental re-alignment based on recorded or estimated deviations from the initial location. In some implementations, a position can be registered directly within the map data 210.

In some implementations, the map data 210 can include a large volume of data subdivided into geographic tiles, such that a desired region of a map stored in the map data 210 can be reconstructed from one or more tiles. For instance, a plurality of tiles selected from the map data 210 can be stitched together by the autonomy system 200 based on a position obtained by the localization system 230 (e.g., a number of tiles selected in the vicinity of the position).

In some implementations, the localization system 230 can determine positions (e.g., relative or absolute) of one or more attachments or accessories for an autonomous platform. For instance, an autonomous platform can be associated with a cargo platform, and the localization system 230 can provide positions of one or more points on the cargo platform. For example, a cargo platform can include a trailer or other device towed or otherwise attached to or manipulated by an autonomous platform, and the localization system 230 can provide for data describing the position (e.g., absolute, relative, etc.) of the autonomous platform as well as the cargo platform. Such information can be obtained by the other autonomy systems to help operate the autonomous platform.

The autonomy system 200 can include the perception system 240, which can allow an autonomous platform to detect, classify, and track objects and actors in its environment. Environmental features or objects perceived within an environment can be those within the field of view of the sensor(s) 202 or predicted to be occluded from the sensor(s) 202. This can include object(s) not in motion or not predicted to move (static objects) or object(s) in motion or predicted to be in motion (dynamic objects/actors).

The perception system 240 can determine one or more states (e.g., current or past state(s), etc.) of one or more objects that are within a surrounding environment of an autonomous platform. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 240 can determine the state(s) using one or more algorithms or machine-learned models configured to identify/classify objects based on inputs from the sensor(s) 202. The perception system can use different modalities of the sensor data 204 to generate a representation of the environment to be processed by the one or more algorithms or machine-learned models. In some implementations, state(s) for one or more identified or unidentified objects can be maintained and updated over time as the autonomous platform continues to perceive or interact with the objects (e.g., maneuver with or around, yield to, etc.). In this manner, the perception system 240 can provide an understanding about a current state of an environment (e.g., including the objects therein, etc.) informed by a record of prior states of the environment (e.g., including movement histories for the objects therein). Such information can be helpful as the autonomous platform plans its motion through the environment.

The autonomy system 200 can include the planning system 250, which can be configured to determine how the autonomous platform is to interact with and move within its environment. The planning system 250 can determine one or more motion plans for an autonomous platform. A motion plan can include one or more trajectories (e.g., motion trajectories) that indicate a path for an autonomous platform to follow. A trajectory can be of a certain length or time range. The length or time range can be defined by the computational planning horizon of the planning system 250. A motion trajectory can be defined by one or more waypoints (with associated coordinates). The waypoint(s) can be future location(s) for the autonomous platform. The motion plans can be continuously generated, updated, and considered by the planning system 250.

The motion planning system 250 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 250 can determine a desired trajectory for executing a strategy. For instance, the planning system 250 can obtain one or more trajectories for executing one or more strategies. The planning system 250 can evaluate trajectories or strategies (e.g., with scores, costs, rewards, constraints, etc.) and rank them. For instance, the planning system 250 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 250 can utilize static cost(s) to evaluate trajectories for the autonomous platform (e.g., "avoid lane boundaries," "minimize jerk," etc.). Additionally, or alternatively, the planning system 250 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 250 can rank trajectories based on one or more static costs, one or more dynamic costs, or a combination thereof. The planning system 250 can select a motion plan (and a corresponding trajectory) based on a ranking of a plurality of candidate trajectories. In some implementations, the planning system 250 can select a highest ranked candidate, or a highest ranked feasible candidate.

The planning system 250 can then validate the selected trajectory against one or more constraints before the trajectory is executed by the autonomous platform.

To help with its motion planning decisions, the planning system 250 can be configured to perform a forecasting function. The planning system 250 can forecast future state(s) of the environment. This can include forecasting the future state(s) of other actors in the environment. In some implementations, the planning system 250 can forecast future state(s) based on current or past state(s) (e.g., as developed or maintained by the perception system 240). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous platform. Additionally, or alternatively, the probabilities can include probabilities conditioned on trajectory options available to one or more other actors.

In some implementations, the planning system 250 can perform interactive forecasting. The planning system 250 can determine a motion plan for an autonomous platform with an understanding of how forecasted future states of the environment can be affected by execution of one or more candidate motion plans.

By way of example, with reference again to FIG. 1, the autonomous platform 110 can determine candidate motion plans corresponding to a set of platform trajectories 112A-C that respectively correspond to the first actor trajectories 122A-C for the first actor 120, trajectories 132 for the second actor 130, and trajectories 142 for the third actor 140 (e.g., with respective trajectory correspondence indicated with matching line styles). The autonomous platform 110 can evaluate each of the potential platform trajectories and predict its impact on the environment.

For example, the autonomous platform 110 (e.g., using its autonomy system 200) can determine that a platform trajectory 112A would move the autonomous platform 110 more quickly into the area in front of the first actor 120 and is likely to cause the first actor 120 to decrease its forward speed and yield more quickly to the autonomous platform 110 in accordance with a first actor trajectory 122A.

Additionally or alternatively, the autonomous platform 110 can determine that a platform trajectory 112B would move the autonomous platform 110 gently into the area in front of the first actor 120 and, thus, may cause the first actor 120 to slightly decrease its speed and yield slowly to the autonomous platform 110 in accordance with a first actor trajectory 122B.

Additionally or alternatively, the autonomous platform 110 can determine that a platform trajectory 112C would cause the autonomous vehicle to remain in a parallel alignment with the first actor 120 and, thus, the first actor 120 is unlikely to yield any distance to the autonomous platform 110 in accordance with first actor trajectory 122C.

Based on comparison of the forecasted scenarios to a set of desired outcomes (e.g., by scoring scenarios based on a cost or reward), the planning system 250 can select a motion plan (and its associated trajectory) in view of the autonomous platform's interaction with the environment 100. In this manner, for example, the autonomous platform 110 can interleave its forecasting and motion planning functionality.

To implement selected motion plan(s), the autonomy system 200 can include a control system 260 (e.g., a vehicle control system). Generally, the control system 260 can provide an interface between the autonomy system 200 and the platform control devices 212 for implementing the strategies and motion plan(s) generated by the planning system 250. For instance, control system 260 can implement the selected motion plan/trajectory to control the autonomous platform's motion through its environment by following the selected trajectory (e.g., the waypoints included therein). The control system 260 can, for example, translate a motion plan into instructions for the appropriate platform control devices 212 (e.g., acceleration control, brake control, steering control, etc.). By way of example, the control system 260 can translate a selected motion plan into instructions to adjust a steering component (e.g., a steering angle) by a certain number of degrees, apply a certain magnitude of braking force, increase/decrease speed, etc. In some implementations, the control system 260 can communicate with the platform control devices 212 through communication channels including, for example, one or more data buses (e.g., controller area network (CAN), etc.), onboard diagnostics connectors (e.g., OBD-II, etc.), or a combination of wired or wireless communication links. The platform control devices 212 can send or obtain data, messages, signals, etc. to or from the autonomy system 200 (or vice versa) through the communication channel(s).

The autonomy system 200 can receive, through communication interface(s) 206, assistive signal(s) from remote assistance system 270. Remote assistance system 270 can communicate with the autonomy system 200 over a network (e.g., as a remote system 160 over network 170). In some implementations, the autonomy system 200 can initiate a communication session with the remote assistance system 270. For example, the autonomy system 200 can initiate a session based on or in response to a trigger. In some implementations, the trigger may be an alert, an error signal, a map feature, a request, a location, a traffic condition, a road condition, etc.

After initiating the session, the autonomy system 200 can provide context data to the remote assistance system 270. The context data may include sensor data 204 and state data of the autonomous platform. For example, the context data may include a live camera feed from a camera of the autonomous platform and the autonomous platform's current speed. An operator (e.g., human operator) of the remote assistance system 270 can use the context data to select assistive signals. The assistive signal(s) can provide values or adjustments for various operational parameters or characteristics for the autonomy system 200. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the autonomy system 200.

Autonomy system 200 can use the assistive signal(s) for input into one or more autonomy subsystems for performing autonomy functions. For instance, the planning subsystem 250 can receive the assistive signal(s) as an input for generating a motion plan. For example, assistive signal(s) can include constraints for generating a motion plan. Additionally, or alternatively, assistive signal(s) can include cost or reward adjustments for influencing motion planning by the planning subsystem 250. Additionally, or alternatively, assistive signal(s) can be considered by the autonomy system 200 as suggestive inputs for consideration in addition to other received data (e.g., sensor inputs, etc.).

The autonomy system 200 may be platform agnostic, and the control system 260 can provide control instructions to platform control devices 212 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 3A:
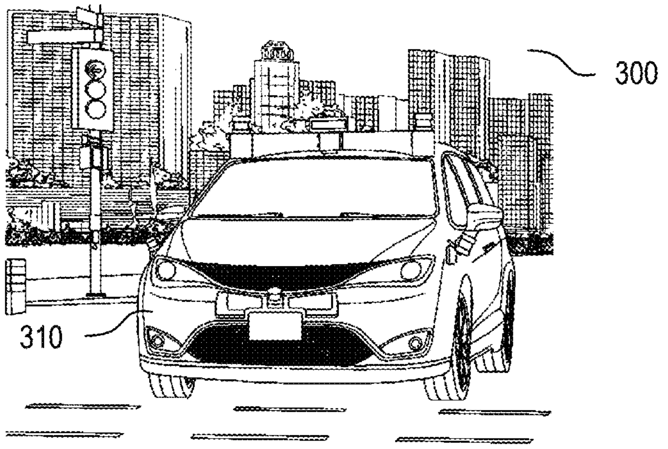
FIG. 3A is a representation of an example operational environment, according to some implementations of the present disclosure.

For example, with reference to FIG. 3A, an operational environment can include a dense environment 300. An autonomous platform can include an autonomous vehicle 310 controlled by the autonomy system 200. In some implementations, the autonomous vehicle 310 can be configured for maneuverability in a dense environment, such as with a configured wheelbase or other specifications. In some implementations, the autonomous vehicle 310 can be configured for transporting cargo or passengers. In some implementations, the autonomous vehicle 310 can be configured to transport numerous passengers (e.g., a passenger van, a shuttle, a bus, etc.). In some implementations, the autonomous vehicle 310 can be configured to transport cargo, such as large quantities of cargo (e.g., a truck, a box van, a step van, etc.) or smaller cargo (e.g., food, personal packages, etc.).

Figure 3B:
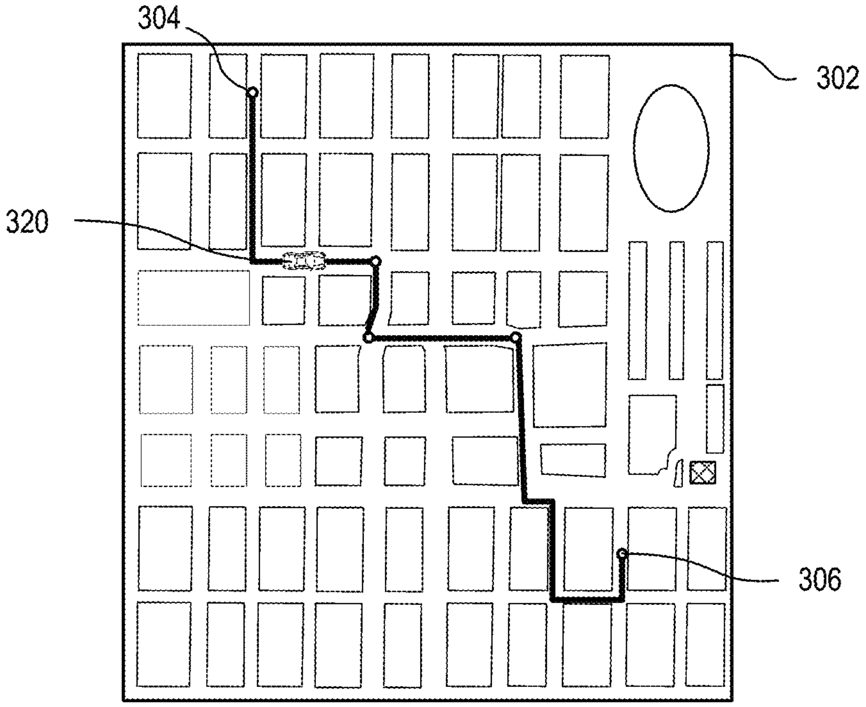
FIG. 3B is a representation of an example map of an operational environment, according to some implementations of the present disclosure.

With reference to FIG. 3B, a selected overhead view 302 of the dense environment 300 is shown overlaid with an example trip/service between a first location 304 and a second location 306. The example trip/service can be assigned, for example, to an autonomous vehicle 320 by a remote computing system. The autonomous vehicle 320 can be, for example, the same type of vehicle as autonomous vehicle 310. The example trip/service can include transporting passengers or cargo between the first location 304 and the second location 306. In some implementations, the example trip/service can include travel to or through one or more intermediate locations, such as to onload or offload passengers or cargo. In some implementations, the example trip/service can be prescheduled (e.g., for regular traversal, such as on a transportation schedule). In some implementations, the example trip/service can be on-demand (e.g., as requested by or for performing a taxi, rideshare, ride hailing, courier, delivery service, etc.).

With reference to FIG. 3C, in another example, an operational environment can include an open travel way environment 330. An autonomous platform can include an autonomous vehicle 350 controlled by the autonomy system 200. This can include an autonomous tractor for an autonomous truck. In some implementations, the autonomous vehicle 350 can be configured for high payload transport (e.g., transporting freight or other cargo or passengers in quantity), such as for long distance, high payload transport. For instance, the autonomous vehicle 350 can include one or more cargo platform attachments such as a trailer 352. Although depicted as a towed attachment in FIG. 3C, in some implementations one or more cargo platforms can be integrated into (e.g., attached to the chassis of, etc.) the autonomous vehicle 350 (e.g., as in a box van, step van, etc.).

With reference to FIG. 3D, a selected overhead view of open travel way environment 330 is shown, including travel ways 332, an interchange 334, transfer hubs 336 and 338, access travel ways 340, and locations 342 and 344. In some implementations, an autonomous vehicle (e.g., the autonomous vehicle 310 or the autonomous vehicle 350) can be assigned an example trip/service to traverse the one or more travel ways 332 (optionally connected by the interchange 334) to transport cargo between the transfer hub 336 and the transfer hub 338. For instance, in some implementations, the example trip/service includes a cargo delivery/transport service, such as a freight delivery/transport service. The example trip/service can be assigned by a remote computing system. In some implementations, the transfer hub 336 can be an origin point for cargo (e.g., a depot, a warehouse, a facility, etc.) and the transfer hub 338 can be a destination point for cargo (e.g., a retailer, etc.). However, in some implementations, the transfer hub 336 can be an intermediate point along a cargo item's ultimate journey between its respective origin and its respective destination. For instance, a cargo item's origin can be situated along the access travel ways 340 at the location 342. The cargo item can accordingly be transported to transfer hub 336 (e.g., by a human-driven vehicle, by the autonomous vehicle 310, etc.) for staging. At the transfer hub 336, various cargo items can be grouped or staged for longer distance transport over the travel ways 332.

In some implementations of an example trip/service, a group of staged cargo items can be loaded onto an autonomous vehicle (e.g., the autonomous vehicle 350) for transport to one or more other transfer hubs, such as the transfer hub 338. For instance, although not depicted, it is to be understood that the open travel way environment 330 can include more transfer hubs than the transfer hubs 336 and 338 and can include more travel ways 332 interconnected by more interchanges 334. A simplified map is presented here for purposes of clarity only. In some implementations, one or more cargo items transported to the transfer hub 338 can be distributed to one or more local destinations (e.g., by a human-driven vehicle, by the autonomous vehicle 310, etc.), such as along the access travel ways 340 to the location 344. In some implementations, the example trip/service can be prescheduled (e.g., for regular traversal, such as on a transportation schedule). In some implementations, the example trip/service can be on-demand (e.g., as requested by or for performing a chartered passenger transport or freight delivery service).

To improve the efficiency of scalable deployment of autonomous platforms, such as an autonomous vehicle (e.g., autonomous platform 110) controlled at least in part using autonomy system 200 (e.g., the autonomous vehicles 310 or 350), example aspects of the present disclosure provide verification and launch techniques.

Figure 4A:
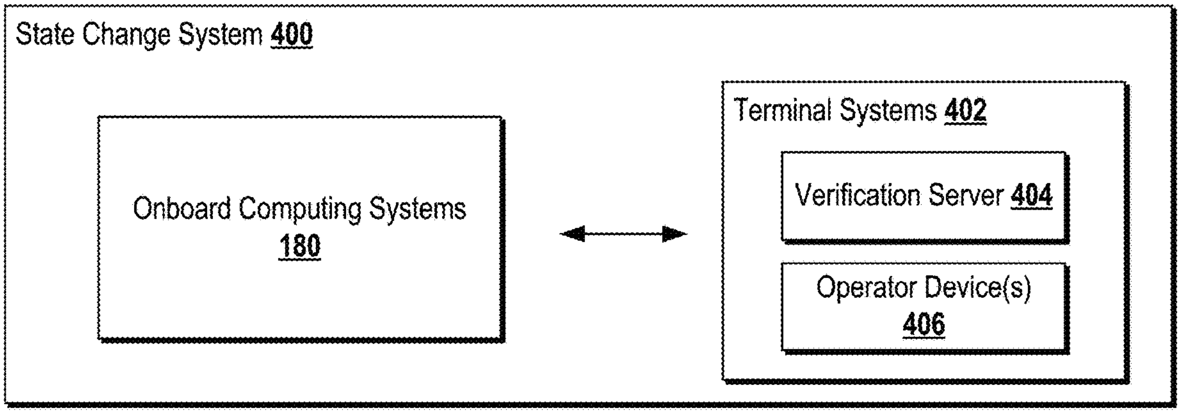
FIG. 4A is a block diagram of an example system for verifying a state change of an autonomous vehicle, according to some implementations of the present disclosure.

FIG. 4A is a block diagram of an example state change system 400 for changing an operational state of an autonomous vehicle, according to some implementations of the present disclosure. Although FIG. 4 illustrates an example implementation of state change system 400 having and interacting with various components, it is to be understood that the components can be rearranged, combined, omitted, etc. within the scope of and consistent with the present disclosure.

State change system 400 can include one or multiple computing systems that cooperatively interact to facilitate operational state changes of an autonomous vehicle. For instance, an autonomous vehicle onboard computing system 180 (e.g., which implements autonomy systems 200) of an autonomous platform 110 can interact with terminal system 402 to engage and disengage operational states of autonomous platform 110. Terminal system 402 can include a verification server 404 that executes verification logic on signals from onboard computing system 180 and stored vehicle data. Terminal system 402 can also include one or more operator devices 406 used by terminal operators to interface with verification system 404 to conduct the queuing, verification, and launch of autonomous platform 110.

State change system 400 can process launch and landing signals to initiate state changes in autonomous platform 110. A given signal can be associated with a request identifier that can be used to identify communications received from participating systems throughout the verification process. For example, verification can include verifying that a request, or an individual communication between state change systems 400 associated with a request, that the request responded to is associated strongly with the state change decision for a specific autonomous platform. This can enable recording of the state change verification procedure with retrieval using the request identifier. This can also enable differentiation between communications from user devices (e.g., operator device(s) 406) and autonomous platform devices (e.g., onboard computing systems 180).

Figure 4B:
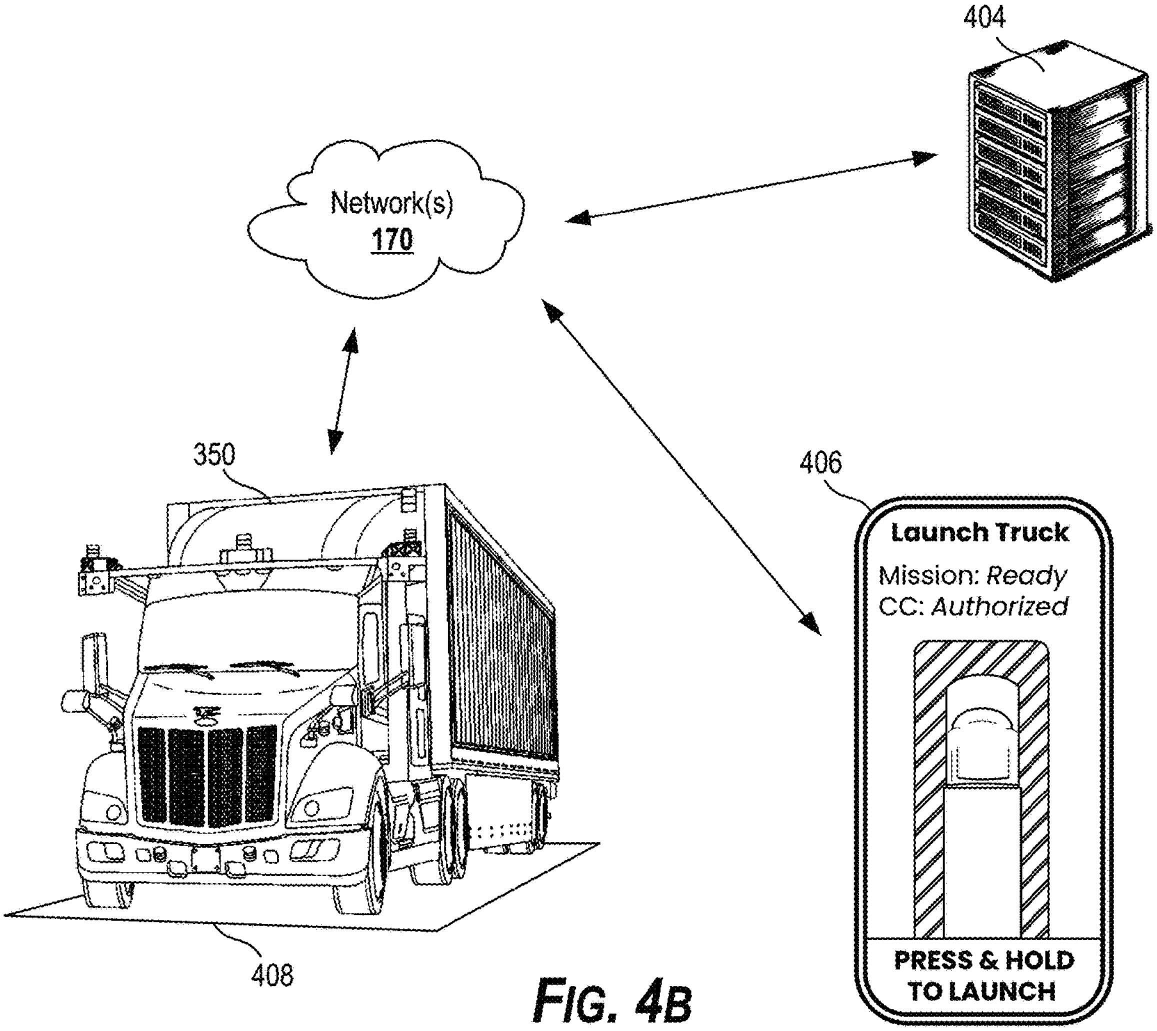
FIG. 4B is a block diagram of an example system for verifying a state change of an autonomous vehicle, according to some implementations of the present disclosure.

FIG. 4B is an illustration of an example implementation of the systems of FIG. 4A. The respective component systems of state change system 400 can communicate via networks 170. Autonomous platform 110 can be an autonomous freight delivery vehicle 350 (e.g., a tractor for towing trailers). A terminal operator can control vehicle 350 to position it within a designated launch pad 408. After ensuring that launch pad 408 has been cleared of any personnel, the terminal operator can interact with an operator device 406 to initiate launch of vehicle 350 on its next mission (e.g., to transfer freight). Operator device 406, verification server 404, and onboard computing system 180 can cooperatively execute launch logic to transition vehicle 350 from a standby state in which vehicle 350 cannot operate autonomously to a computer-controlled state in which vehicle 350 operates autonomously. Upon entering the computer-controlled state, vehicle 350 can begin to execute the mission.

State change system 400 can be or include one or multiple computing devices or systems distributed across one or multiple locations. State change system 400 can include participating devices onboard autonomous vehicles, stationary devices located on-site at a terminal location, cloud-hosted compute resources, mobile computing devices, etc.

In an example, state change system 400 can include a single participating computing device or system. For example, state change system 400 can include onboard computing system 180 to directly manage its own state changes. For example, onboard computing system 180 can interact with a terminal operator using an onboard interface to facilitate state changes. For example, during the interaction the terminal operator can enter a vehicle to interact with an onboard interface to facilitate a state change. In an example, functionality may be limited when onboard computing system 180 alone facilitates state changes. For instance, when onboard computing system 180 alone facilitates state changes, available state changes may be limited to those which reduce autonomous capability or restore manual control. The stage change logic described herein can be implemented entirely within onboard computing systems 180.

In another example, state change system 400 can include two participating computing devices or systems. For instance, onboard computing system 180 can interact with an operator device 406 to facilitate state changes. The devices can communicate directly (e.g., through an ad-hoc LAN, Bluetooth, ultrawideband, or other wireless or wired direct communication technology). The devices can communicate via a network hosted by one or more networking devices. The state change logic described herein can be implemented cooperatively between the participating systems.

In another example, state change system 400 can include three participating computing devices or systems. For instance, onboard computing system 180 can interact with one or both of a verification server system 404 and an operator device 406. In an example, a verification server system 404 executes back-end processing logic while operator device 406 provides an interactive front-end interface for control of terminal system 402. It is to be understood, however, that operations described herein as performed by terminal system 402 can be executed on or by verification server system 404, operator device 406, another computing system or device, or cooperatively between any of the preceding systems (e.g., with different operations being performed on each).

Terminal system 402 can include one or multiple computing systems associated with a terminal location. A terminal location can be a fixed or movable geographic region designated for launching and landing autonomous vehicles. A terminal location can include infrastructure configured for supporting an autonomous vehicle service, including vehicle maintenance facilities, vehicle storage facilities, vehicle loading and unloading facilities, vehicle inspection facilities, etc.

A terminal location can include computing infrastructure configured to support launching or landing an autonomous vehicle. In a freight carrying context, for instance, relevant computing infrastructure can include weigh scales configured to determine a weight of a vehicle (e.g., a vehicle and its cargo). Other infrastructure can be adapted to perform various readiness procedures, such as pre-launch sensor calibrations. For example, calibration infrastructure can include structures or devices configured to have a known set of reference geometric or kinematic attributes (e.g., a size, distance, and spacing of reflectors, a speed of a moving target, etc.). The terminal location can facilitate efficient calibration confirmation and re-calibration of vehicle sensors prior to launch, after landing, etc.

Additional infrastructure can include one or more human-machine interfaces. These interfaces can be fixed or movable. For instance, an interface configured for providing a launch command button can be fixed a distance away from launch pad 408 to ensure that an operator pressing the launch command button is not currently on launch pad 408. The interfaces can be network-connected or otherwise in communication with an operator device 406 or verification server 404.

Verification server 404 can be or include a computing system that executes processing logic to conduct verification checks on the readiness of autonomous platform 110 and any participating terminal operators prior to launch of autonomous platform 110. Verification server 404 can be on-site or remote.

Operator device 406 can be or include a computing system that executes processing logic to perform operations for at least a portion of one or more verification checks on the readiness of autonomous platform 110 and any participating terminal operators prior to launch of autonomous platform 110. Operator device 406 can conduct such verification checks cooperatively with verification server 404. In an example, operator device 406 provides a human-machine interface for obtaining inputs for confirming a status of a respective component of a vehicle (e.g., a connection status of a trailer, an inflation status of a tire, a status of any necessary paperwork, etc.), capturing images of the vehicle (e.g., for recordkeeping, for further processing to perform a verification check using image processing methods, etc.), obtaining authentication values from the terminal operator to authorize proceeding with a launch, etc. Operator device 406 can be a stationary computing device (e.g., integrated into terminal facility infrastructure or otherwise embedded) or mobile computing device (e.g., phone, table, laptop, etc.).

Launch pad 408 can be or include a designated spatial area in which a vehicle is to launch. The area can correspond to visual boundaries (e.g., painted lines, cones, etc.). The area can be permanent (e.g., specially constructed lanes, painted lines, etc.) or ad-hoc (e.g., bounded by reflective cones for a launch at a location away from a terminal).

It is to be understood, however, that the launch and landing procedures described herein may be implemented without use of a designated launch pad (e.g., launching/landing ad-hoc in any desired location). For example, various implementations of the technology described herein may be applied to launch or land a vehicle on an ad-hoc basis, such as on a shoulder of a roadway. In such an example, launch pad 408 can be an ad-hoc area of the shoulder on which the vehicle is located. Terminal systems 402 can be engaged remotely from the location of a physical terminal itself. In some examples, terminal systems 402 may not be associated with any specific physical terminal location and may instead provide terminal operations remotely to a variety of non-terminal locations (e.g., ad-hoc locations).

Launch pad 408 can be monitored to help confirm vehicle readiness. An aspect of vehicle readiness can include an absence of terminal operators within a boundary of the launch pad. A presence of a terminal operator within a boundary of the launch pad can be detected using one or more cameras distributed around the launch pad (e.g., overhead view, upper ¾ view left side, upper ¾ view right side, rear view, etc.). Other sensors can be used, such as ranging sensors (RADAR, LIDAR), thermal imaging sensors, motion sensors, etc.

A launch pad can also be used as a landing pad. In an example, a terminal operator can manually control (e.g., remotely or onboard) a vehicle to park the vehicle in the launch pad area. The terminal operator can immobilize the vehicle (e.g., place the vehicle transmission in "park," engage parking brake, etc.). Afterward the terminal operator can exit the vehicle (if controlling onboard) and ensure that the launch pad area is cleared so that launch can proceed. In a landing example, the vehicle can proceed toward the launch pad area and park itself in the launch pad area. The vehicle can immobilize itself (e.g., place the vehicle transmission in "park," engage parking brake, etc.) and disengage autonomous control. Afterward the terminal operator can control the vehicle (e.g., remotely or onboard) to remove the vehicle from the launch pad area (e.g., to unload or transfer cargo carried by the vehicle).

Launch pad 408 can correspond to a geofence or other location-based triggering mechanisms. For example, certain functionality of any one of terminal system 402 or onboard computing system 180 can be unlocked when the vehicle is positioned within the boundaries of launch pad 408. For instance, a mechanism for state changes that increase autonomous control functionality can be geofenced to the launch pad area.

The geofence can be digital or mechanical. The geofence can be triggered by GPS location. The geofence can be triggered by location detected using ultrawideband radio. The geofence can be triggered with weight sensors, a magnetic interlock, near-field communications, electrical contact, etc.

Figure 5:
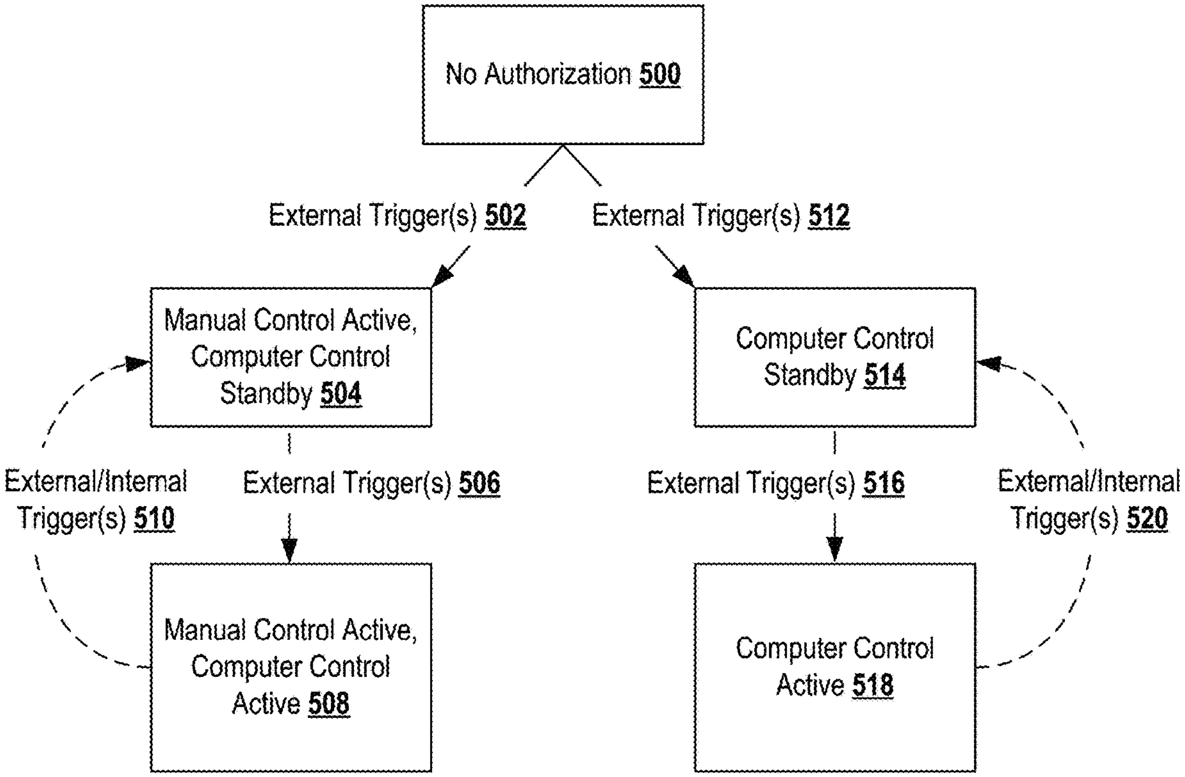
FIG. 5 is a state machine diagram for an example system for verifying a state change of an autonomous vehicle, according to some implementations of the present disclosure.

FIG. 5 is a block diagram of an operational state configuration of an autonomous control system, according to example aspects of the present disclosure. A vehicle can begin in a no-authorization state 500. One or more external triggers 502 can cause the vehicle to enter manual control active, computer control standby state 504 from the no-authorization state 500. One or more external triggers 506 can cause the vehicle to enter manual control active, computer control active state 508 from the manual control active, computer control standby state 504. One or more external or internal triggers 510 can cause the vehicle to roll back to state 504, effectively disengaging computer control.

From no authorization state 500, one or more external triggers 512 can cause the vehicle to enter state 514, a computer control standby state. One or more external triggers 516 can cause the vehicle to enter state 518, a computer control active state from state 514. One or more external or internal triggers 520 can cause the vehicle to roll back to state 514, effectively disengaging computer control.

No authorization state 500 can be a default state upon power cycling the vehicle. No authorization state 500 can be a state which permits varying levels of operation of the vehicle. No authorization state 500 can be a state in which the vehicle cannot operate at all. For instance, in state 500, an example vehicle can be completely immobilized (e.g., with a hardware or software power interlock to an ignition system, motor controller, etc.). No authorization state 500 can be a state in which the vehicle's autonomy systems 200 are inactive while the vehicle is otherwise operational. For instance, in state 500, an example vehicle can be driven as any other non-autonomous vehicle.

An external trigger can be an event that occurs outside of the control of the vehicle. For instance, generally a vehicle cannot itself initiate an external trigger. An external trigger can include detecting a button press (e.g., inside or outside of the vehicle), receiving a communication (e.g., a data packet, a radio signal, etc.), or another electrical or mechanical interaction.

Internal triggers can be events that occur within the control of the vehicle (e.g., initiated by the vehicle). For example, an internal trigger can be initiated based on detection of a threshold condition (e.g., a fault condition) that is designated as triggering a state change.

External or internal triggers can be cryptographically signed to ensure that state changes occur with proper authorization. External triggers can be signed using cryptographic keys that evidence a trusted source of any external trigger. For example, external trigger data messages can be signed such that onboard computing system 180 can confirm that the message source is an approved and trusted source. Internal triggers can be signed using cryptographic keys derived from or assigned to different components of onboard computing system 180 (e.g., embedded identifiers, assigned identifiers, etc.). The keys can be updated periodically to ensure that all participating systems are operational and operating in an actively authenticated session. Various different security architectures, algorithms, and protocols can be used.

External triggers 502, 506, 512, 516 can be the same or different. In an example, external triggers 502, 506, 512, 516 can include detection of engagement of a user interface (e.g., button) located in a cabin of the vehicle, such as on a dashboard or steering wheel. External triggers 502, 506, 512, 516 can include detection of engagement of a user interface (e.g., button) located outside the cabin of the vehicle, such as within an external lockbox or via an external keyed switch. External triggers 502, 506, 512, 516 can include receiving a data transmission from an external computing system (e.g., terminal systems 402).

Manual control active, computer control standby state 504 can be a state in which one or more components of autonomy systems 200 are booted but not in full control of the vehicle, with manual controls remaining active. In this state, for example, one or more components of autonomy systems 200 can record perception data, perform localization, generate motion plans, or perform any other action short of exercising full directional and motive control of the vehicle. A prerequisite to entering manual control active, computer control standby state 504 from state 500 can include engagement of a parking brake or other brake system.

Manual control active, computer control active state 508 can be a state in which autonomy systems are fully operational and can exercise full directional and motive control of the vehicle while also remaining subject to manual override and intervention. For instance, one or more control systems or actuators can be configured to defer to any input provided via a manual control interface.

External or internal triggers 510 can be configured to roll back an operational state of the vehicle to manual control active state 504. For instance, an external trigger can include a vehicle operator's override of autonomous control (e.g., by pressing an override button, by moving a steering wheel, pressing a brake or accelerator, etc.). An internal trigger can be a method executed by onboard computing system 180 that detects operational incapacity (e.g., a fault condition, a mapping failure, etc.) and returns control to a vehicle operator.

Onboard computing system 180 can be configured to drive a vehicle without reliance on a vehicle operator. In such driving modes, the system may execute autonomy systems 200 in operational states similar to states 504 and 508, except without presumption of manual control fallbacks. For example, in states 514 and 518, manual control inputs can either be ignored (e.g., control signals disregarded), locked out (e.g., one or more control interfaces electrically or mechanically engaged in a stationary position), or simply expected to be unavailable. For instance, at least some controls can be configured to always allow manual override (e.g., steering, brake), even if the autonomous control logic does not encode a presumption that override is available as a fallback.

Computer control standby state 514 can be a state in which one or more components of autonomy systems 200 are booted but not in full control of the vehicle. In this state, for example, one or more components of autonomy systems 200 can record perception data, perform localization, generate motion plans, or perform any other action short of exercising full directional and motive control of the vehicle.

External trigger 516 can be a separate and distinct trigger event from external trigger 512. External trigger 516 can correspond to engagement of a physical user interface that is different from a user interface used to initiate external trigger 512. In an example, external trigger 512 is initiated via button press within the vehicle, and external trigger 516 is initiated via button press external to the vehicle at a different location from the vehicle (e.g., a distance away from launch pad 408).

In an example, the execution of the transition from state 514 to state 518 is performed by an operator-initiated action from offboard the vehicle. The operator-initiated action can cause terminal systems 402 (e.g., verification server 404 or operator device 406) to send a signal (e.g., a START_OF_MISSION signal) to an autonomy mode manager executing on onboard computing system 180. A control bridge system can receive the START_OF_MISSION signal and securely communicate a state transition command to autonomy systems 200. Autonomy systems 200 can execute the state transition if the vehicle is ready for computer control and begin executing a received trajectory. The trajectory can include the request for mobilization/immobilization.

Computer control active state 518 can be a state in which autonomy systems are fully operational and can exercise full directional and motive control of the vehicle.

External or internal triggers 520 can be configured to roll back an operational state of the vehicle to computer control standby state 514. For instance, an external trigger can include a remote override procedure that sends a data transmission to onboard computing system 180 that initiates the state change. An internal trigger can include a determination that the vehicle has completed a mission, arrived at a launch pad location, and successfully immobilized itself. An internal trigger can include a failed state transition out of computer control standby 514 or a violation of one of the prerequisites on which the state transition into computer control active state 518 was based.

Transitioning into computer control active state 518 can correspond to a plurality of prerequisite conditions. In an example, onboard computing system 180 can monitor door, seat, seatbelt, and other information to block engagement of computer control active 518 if a person is detected onboard. A prerequisite can include engagement of a parking brake or other brake system. Other prerequisites can include any one or more of completion of required data entries (e.g., recording weight), clearing all service holds, receipt of clearance for launch (e.g., from onboard computing system 180 to indicate readiness or from terminal systems 402 to indicate approval), no detected road construction that would impact the system's ability to navigate the route, no detected weather conditions that would impact the system's ability to navigate the route, etc.

An example prerequisite is that the vehicle may need to be in computer control standby state 514 in order to transition to computer control active state 518. An example prerequisite is that a motion planning system of the vehicle has received a goal list (e.g., a list of locations to which to navigate) and is capable of generating valid trajectories toward those goal locations. A prerequisite can include engagement of a parking brake or other brake system.

An example prerequisite is that autonomy system 200 is receiving valid trajectories capable of execution. In an example, this prerequisite can be met by receiving a trajectory from a motion planner and determining whether the vehicle is currently on the trajectory. For instance, for a vehicle on a launch pad, a valid trajectory may begin at the vehicle's current position on the launch pad.

An example prerequisite is that autonomy system 200 is receiving valid pose estimates. An example prerequisite is that autonomy system 200 itself performs a health check and issues a readiness signal.

An example prerequisite is that the autonomous vehicle will only operate in a domain in which it is designed to operate. For instance, an operational domain prerequisite can correspond to an autonomous vehicle's capability to drive in a particular region of a map. The capability can be determined based on static or dynamic factors. For instance, environmental conditions can change over time. A capability of the vehicle as to conditions at multiple points in time can be evaluated. For example, a mission can span one or multiple hours. As such, times across the entire mission duration may be evaluated to determine if the entire mission is within the vehicle's capabilities (e.g., if at any point a capability is likely to be exceeded).

One or more environmental conditions can include a weather condition along the route. For instance, the system can evaluate a capability of the vehicle to navigate in inclement weather, such as rain, fog, snow, ice, etc. One or more environmental conditions can include a traffic condition along the route. For instance, the system can evaluate a capability of the vehicle to navigate in heavy traffic, construction detours, etc. One or more environmental conditions can include an infrastructure condition along the route. For instance, the system can evaluate a capability of the vehicle to navigate in construction zones, lane closures (e.g., temporary reversals of lane directions, etc.).

The capabilities of a vehicle for a given mission can be processed at various levels of granularity. For instance, a go/no-go signal can be determined based on a spatial unit (e.g., the vehicle has/does not have capability to access unit N at a given time). The spatial unit can be a tile of a map. For instance, a mapped area can be divided into tiles, and capabilities can be evaluated for each tile, or at least each tile implicated by a route for a mission.

If at least one tile implicated by a route for a mission is associated with an environmental condition exceeding a capability of the vehicle, the system can attempt to re-route the mission. Capabilities can be evaluated for the new route. This process can repeat in series or parallel (e.g., multiple candidate re-routes in parallel) until a retry threshold is reached.

If failure to pass the capability check is based on a dynamic factor, the system can predict (e.g., using one or more machine-learned models or other forecasting tool, or using a provided forecast) a time at which the dynamic factor is expected to change to fall within acceptable limits. For instance, if inclement weather conditions cause the failure of the prerequisite, the system can obtain a time at which the weather conditions are expected to be within an acceptable operational domain. The system can reschedule the mission such that the vehicle encounters the previously-affected spatial unit at such time that the dynamic factor satisfies the prerequisite.

An example prerequisite is based on clearance of all service holds. A service hold can include a maintenance or other action that is to be completed as a prerequisite to transitioning to computer control active state 518. A service hold can include schedule-based maintenance tasks (e.g., based on accumulated mileage, time intervals, etc.) that are currently outstanding. A service hold can include ad-hoc maintenance tasks that are added to a queue by a terminal operator based on manual inspection (e.g., visual inspection revealing a flat tire, dirty sensor lens, etc.). A service hold can include ad-hoc maintenance tasks that are added to a queue by an automated inspection system integrated with terminal systems 402. For instance, an inspection system can process images or other sensor returns descriptive of the vehicle to assess a current state of the vehicle and infer likely maintenance tasks to perform.

A service hold can include ad-hoc maintenance tasks that are added to a queue by the vehicle itself. For instance, during a mission, the vehicle can detect wear or other degradation of various vehicle components. For example, the vehicle can detect buildup of grime or other contaminants on sensor surfaces, tire pressure, tire grip (e.g., based on a detected slip threshold), tread depth (e.g., based on tire imaging), engine fluid levels, trapped debris in cooling channels, etc. Such wear events may not affect completion of the current mission. However, the vehicle can add such detected wear events to a service hold queue. As such, addressing the wear events can form a prerequisite to launch on a subsequent mission.

Clearing a service hold to satisfy a prerequisite can include receiving data indicating completion of the service hold (e.g., toggling of a checklist item rendered on a user interface of operator device 406). Clearing a service hold can include verifying a replacement of a component or performance of another task. For instance, terminal systems 402 can verify replacement of a component using visual inspection by processing images captured of the vehicle to determine the presence of the component. Terminal systems 402 or the vehicle itself can verify cleaning of a component using visual inspection by processing images captured of the vehicle to determine the cleaning of the component. Terminal systems 402 can communicate with the vehicle to determine performance of the task. For instance, the sensors or other devices on the vehicle that detected the wear event can be polled to evaluate whether the wear event is detected at a current time. If the wear event is no longer detected, terminal systems 402 can clear the corresponding service hold.

In an example, pending service holds can be associated with a time to complete or other ranking metric. Vehicles can be scheduled for missions based on a listing of any service holds associated with the vehicle. For instance, vehicles without service holds can be prioritized for selection for near-term missions. Vehicles with quickly resolvable services holds can be selected next, if vehicles clear of service holds are not available. Vehicles with service holds that may take longer to resolve can be deprioritized for immediate selection and may be scheduled for missions not in the near term or may not be placed on a schedule at all. For instance, vehicles with indeterminate service holds (e.g., undiagnosed or unconfirmed issues) can be held out from an active service pool).

An example prerequisite is based on a client-specific policy. For instance, a vehicle can be deployed on a mission to perform a service for a particular client entity. The client entity can be associated with a client system. The client system can provide one or more constraints or other prerequisite conditions that are to be satisfied prior to launch.

An example client-specific policy can include activation of a specific telemetry system associated with the client system (e.g., for the client's own recordkeeping), such that the vehicle does not launch on the mission without confirmation that the client's telemetry system is operating.

An example client-specific policy can include accessibility provisions. An example prerequisite for this policy can include confirmation that the provisions are provided. For instance, for a ride-sharing mission, a particular client system can provide a request message that indicates a request for a wheelchair-accessible vehicle. An example prerequisite for this policy can include a check to confirm that a wheelchair ramp is operational, such that the vehicle does not launch on the mission without confirmation that the requested is satisfied.

An example client-specific policy can include personalization provisions. An example prerequisite for this policy can include confirmation that the provisions are provided. For instance, for a ride-sharing mission, a particular client system can provide a request message that indicates a request for a lumbar pillow. An example prerequisite for this policy can include a check to confirm that a lumbar pillow is placed in the vehicle, such that the vehicle does not launch on the mission without confirmation that the requested is satisfied.

An example client-specific policy can include delivery provisions. An example prerequisite for this policy can include confirmation that the provisions are provided. For instance, for an object delivery mission, a particular client system can provide a request message that indicates an object to be delivered. An example prerequisite for this policy can include a check to confirm that the object is placed in the vehicle, on the vehicle, or otherwise transported by the vehicle, such that the vehicle does not launch on the mission without confirmation that the requested is satisfied.

An example prerequisite is based on a mission-specific policy. For instance, a mission can specify the use of particular equipment (e.g., a trailer, a type of trailer, etc.). An example mission-specific policy can include an operability check of the equipment. For instance, the equipment can be a refrigerant system of a trailer towed by the vehicle, such that the vehicle does not launch on the mission without confirmation that the contents of the trailer are refrigerated.

In general, one or more prerequisites can be checked at an early stage of vehicle preparation in addition to or in lieu of checks performed upon attempt to change states into computer control active state 518. For example, one or more prerequisites for computer control active state 518 can be checked by referring back to a prior checkpoint and determining whether any conditions affecting the prerequisites have changed. In this manner, for instance, fault conditions or other impediments to launch can be determined at an early stage prior to performing one or more other vehicle preparation operations.

In an example, any one or more of (e.g., all of) the prerequisites for transitioning to computer control active state 518 are checked upon transition to computer control standby state 514. In an example, any one or more of (e.g., all of) the prerequisites for transitioning to computer control active state 518 are also prerequisites to transition to computer control standby state 514. In this manner, for instance, additional processing time to verify additional prerequisites for computer control active state 518 can be saved if, at an earlier stage, a prerequisite failure is detected that requires rescheduling of the mission to a later time.

As prerequisites are checked and their statuses recorded, the data describing the prerequisite statuses can be published to terminal systems 402 for distribution to operator devices 406 (e.g., via a mobile application interface).

Current state values for the vehicle can be published for communication to different systems. For instance, operator devices 406 can display a current state for one or more vehicles. An output device on the vehicle can indicate a current state or a change from state to state (e.g., an audible alarm or announcement in one or more languages). An output device embedded in a terminal location infrastructure can indicate a current state for one or more vehicles or a change from state to state (e.g., an audible alarm or announcement in one or more languages, a display associated with a launch pad, such as a set of indicator lights, a screen, etc.).

A transition from computer control standby state 514 to computer control active state 518 can fail if a launch request times out. For instance, when terminal systems 402 acts as external trigger 516, after sending the trigger data, terminal systems 402 can listen for a successful control state transition response from the vehicle. If after a designated timeout period (e.g., one minute) no response is received, the transition can be marked as failed and terminal systems 402 can issue a stop transition command (e.g., as trigger 520).

Example causes of timeout can include a stale instruction by the time prerequisites are confirmed. For instance, if the vehicle is not ready for computer control operations for Z seconds after receiving a verified START_OF_MISSION request, the request can be discarded by the onboard computing system. Proceeding can involve repeating the state change procedure in full or in part.

Figure 6:
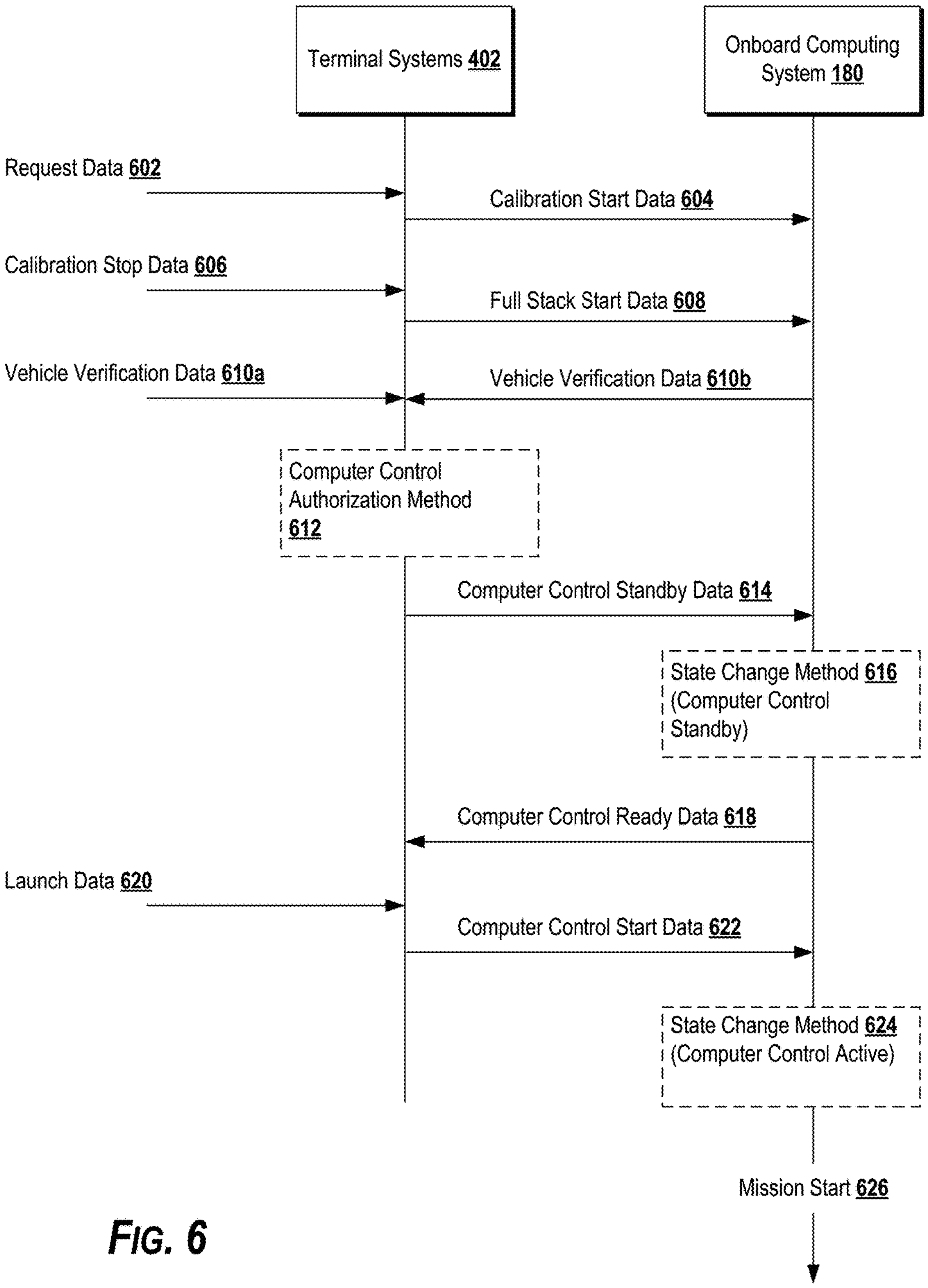
FIG. 6 is a communication diagram for an example system for verifying a state change of an autonomous vehicle, according to some implementations of the present disclosure.

FIG. 6 is a communication timeline diagram illustrating an example data flow between terminal system 402 and onboard computing system 180 for launching an autonomous vehicle according to an example implementation according to the present disclosure. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of the communications or operations can be performed additionally, or alternatively, by other systems.

Terminal systems 402 can obtain request data 602 that indicates request to launch a vehicle. The request can indicate a vehicle that is assigned to perform a mission. Prior to the mission start time, terminal systems 402 can transmit calibration start data 604 to onboard computing system 180 to initiate a calibration mode or procedure. Upon completion of calibration, terminal systems 402 can obtain calibration stop data 606 from onboard computing system 180 or another system or device. Terminal systems 402 can transmit full stack start data 608 to onboard computing system 180 to boot all autonomy systems 200. Terminal systems 402 can obtain vehicle verification data **610*a* that describes a reference operational status for one or more components of the vehicle (e.g., current map versions, current software versions, hardware calibration limits, etc.). Terminal systems 402 can obtain vehicle verification data 610*b* from onboard computing system 180 that describes an actual operational status for one or more components of the vehicle (e.g., actual map version, actual software version, actual hardware calibration data, etc.). Terminal systems 402 can execute a computer control authorization method 612 that attempts to authorize the vehicle, based on the obtained vehicle data, to transition from a no authorization state 500 to computer control standby 514**.

Upon authorization, terminal systems 402 can implement trigger 512 by issuing computer control standby data 614 that instructs onboard computing system 180 to transition to computer control standby state 514 according to state change method 616. Upon successful completion of state change method 616, onboard computing system 180 can respond to terminal systems 402 with computer control ready data 618 that indicates a successful state change into computer control standby 514.

Upon obtaining launch data 620 (e.g., from an input interface receiving an input from a terminal operator), terminal systems 402 can transmit computer control start data 622 to onboard computing system 180, which can then execute a state change method 624 to transition the vehicle's operational state from computer control standby 514 to computer control active state 518.

Upon successful transition into computer control active state 518, the vehicle can proceed to mission start 626.

Request data 602 can be or include data that describes a mission for a vehicle to complete. Request data can include a mission profile. A mission profile can include an identifier of a vehicle assigned to a mission. A mission profile can include a destination or goal location associated with the mission. A mission profile can include data identifying (i) the autonomous vehicle, (ii) a route for execution by the autonomous vehicle, such as by communicating a goal list, (iii) a software version for a component of the vehicle, or (iv) a map version.

Request data 602 can be triggered based on a user input. For instance, a terminal operator can interact with operator device 406 to select a next mission to launch.

Request data 602 can be obtained from a scheduling database. For instance, request data 602 can be automatically received based on a schedule. A scheduling database can include multiple missions mapped out over time. Terminal systems 402 can receive request data 602 and initiate launch of an identified vehicle in advance of a mission start time. In an example, terminal systems 402 can initiate a launch workflow an offset time in advance of a mission start time, with the offset time being based on an expected duration of a launch procedure.

Upon obtaining request data 602, terminal systems 402 can perform one or more checks against a launch prerequisite. For example, upon identifying a vehicle for a mission, terminal systems 402 can evaluate whether there are any pending service holds or other maintenance actions for the vehicle. These can be handled early, prior to advancing the vehicle all the way to launch. Additionally, data in the mission profile can be validated, such as to validate a goal list, a map version, a software version, or other data indicated in the mission profile.

Calibration start data 604 can include an instruction to start a calibration mode. A calibration mode can include an operational mode in which one or more autonomy systems 200 operate to ingest sensor data descriptive of the vehicle's environment and evaluate a performance of the sensor data processing based on known information associated with the environment. The environment can be a designated calibration environment that provides precise ground truth information describing positions and movement profiles of objects in the environment. The vehicle can autonomously navigate through the calibration environment or be manually navigated through the calibration environment in calibration mode. A calibration mode can be part of a manual control active, computer control standby state 504.

Calibration stop data 606 can include a command to stop a calibration mode or an update that calibration is complete. A calibration complete update can be received from a system being calibrated (e.g., one or more of autonomy systems 200), a system performing the calibration (e.g., a calibration system of terminal systems 402), or an operator device 406 that receives a user input indicating a completion of a calibration procedure.

Full stack start data 608 can include a command to boot a full autonomy stack of the vehicle. For instance, calibration mode may only involve partial boot of the autonomy systems. In general, terminal systems 402 can execute stack switching for the vehicle. For instance, different boot modes of the autonomy stack (e.g., one or more of autonomy systems 200) can provide for different functionality (e.g., calibration mode, readout only mode, full control mode, etc.). Terminal systems 402 can interact with the vehicle to cause onboard computing system 180 to switch between modes (e.g., based on a current task being performed). In some situations, rebooting the systems can involve restoring a state of the systems (e.g., a pose, object tracking data, etc.) for seamless transition. Terminal systems 402 can store state values for the vehicle and restore the values after switching. This restoration can help decrease a latency of switchover, as the vehicle may avoid rebuilding a new world state anew.

Vehicle verification data 610*a* can include status data describing one or more components of the vehicle. The status data can be actual status data (e.g., recorded based on readings from the vehicle or inputs descriptive of the vehicle) or reference status data (e.g., target values for what the vehicle attributes should be). Vehicle verification data 610*a* can be obtained from a database, user inputs to operator device 406, or other systems (e.g., a calibration system).

Vehicle verification data 610*b* can include status data describing one or more components of the vehicle that is obtained from the vehicle itself. For instance, the status data can be actual status data (e.g., recorded based on readings from the vehicle or inputs descriptive of the vehicle). For example, upon boot, the autonomy systems 200 can report current operational information regarding each component system, such as software versions, map versions, health check status, etc.

Vehicle verification data 610*b* can include an identifier of the vehicle. This identifier can be cryptographically signed to ensure that it is the authentic identifier of the vehicle. The verified identifier can be matched to an identifier in a mission profile to confirm that onboard computing system 180 is associated with a vehicle that has been authorized to launch.

Computer control authorization method 612 can include a software subroutine or interactive guided workflow (e.g., interactive between an automated system and one or more user input sequences input to operator device 406) configured to execute an authorization procedure to ensure that the vehicle is ready to proceed to a computer control standby state 514. Computer control authorization method 612 can operate to determine whether at least some of the prerequisites for computer control active state 518 are met. For instance, computer control authorization method 612 can evaluate whether vehicle systems are sufficiently healthy or otherwise operational to conduct full autonomous control, whether the vehicle possesses the requisite data to execute the mission (e.g., current maps, valid goal lists, etc.).

Upon completion of computer control authorization method 612, the vehicle can be placed in computer control standby state 514. The trigger for placing the vehicle in computer control standby state 514 can be external, such as based on an input from a terminal operator on a user interface of operator device 406. For instance, once the authorizations are complete, a “Launch Truck” button in an application interface of the operator device can become pressable or “light up.”

Computer control standby data 614 can include a command issued based on successful completion of computer control authorization method 612 and optionally an additional user input (e.g., button press) that instructs onboard computing system 180 to change the operational state of the vehicle to computer control standby 514. Computer control standby data 614 can be an external trigger 502. Computer control standby data 614 can be cryptographically signed.

State change method 616 can include a software subroutine configured to execute a state transition from no authorization state 500 to computer control standby state 514. State change method 616 can operate to determine whether the prerequisites for entering computer control standby state 514 are met and, if so, proceed to engage computer control standby state 514.

Computer control ready data 618 can include an update or response transmitted from onboard computing system 180 to terminal systems 402 to indicate a successful state change.

Launch data 620 can include a command received by terminal systems 402 to initiate launch. Launch data 620 can be obtained based on a launch signal input from a human-machine interface. For instance, a human-machine interface of operator device 406 can receive an input from a terminal operator. Operator device 406 can, responsive to the input, transmit launch data 620 to terminal systems 402. Launch data 620 can include data describing the launch or can be simply an indicator of receipt of the input.

In an example, operator device 406 can provide a user interface for receiving an input from a terminal operator. The input can be, for instance, a touch on a touch interface. The input can be configured to require a long press of a touch interface. The user interface can include a physical button. The user interface for initiating launch data 620 can be at a location different from (e.g., spaced a distance away from) launch pad 408.

Responsive to obtaining launch data 620, terminal systems 420 can initiate a launch procedure. For instance, terminal systems 420 can perform one or more prerequisite checks.

For example, terminal systems 402 can check a map version. In an example, terminal systems 402 can periodically poll onboard computing system 180 for its map version (or refer to a stored status of its map version) and poll a map repository to confirm that the vehicle has the most recent map version. Upon receipt of launch data 620, terminal systems 402 can conduct another check.

For example, terminal systems 402 can check a software version for one or more components of autonomy systems 200 (e.g., a perception system version, a localization system version, a motion planning system version, a control system version, etc.). In an example, terminal systems 402 can periodically poll onboard computing system 180 for its software versions (or refer to a stored status of its software versions) and poll a software repository to confirm that the vehicle has the most recent software versions. Upon receipt of launch data 620, terminal systems 402 can conduct another check.

For example, terminal systems 402 can check a service hold state. In an example, terminal systems 402 can periodically poll onboard computing system 180 or a service hold database for any outstanding service holds for the vehicle (e.g., outstanding maintenance, updates, recalls, etc.). Upon receipt of launch data 620, terminal systems 402 can conduct another check.

For example, terminal systems 402 can check a goal list state. In an example, terminal systems 402 can periodically poll onboard computing system 180 or a mission database for a current goal list for the vehicle and confirm whether the goal locations are valid and reachable. Upon receipt of launch data 620, terminal systems 402 can conduct another check.

Computer control start data 622 can include a command to initiate transition from computer control standby state 514 to computer control active state 518. Computer control start data 622 can operate as a launch signal configured to initiate launch of the vehicle.

State change method 624 can include a software subroutine configured to execute a state transition from computer control standby state 514 to computer control active state 518. State change method 624 can operate to determine whether the prerequisites for entering computer control active state 518 are met and, if so, proceed to engage computer control active state 518.

Mission start 626 can include initiation of the mission. For instance, upon completion of the state transition to computer control active state 518 (the change initiated by and responsive to receipt of computer control start data 622), onboard computing system 180 can issue control signal commands to control one or more actuators or other devices to initiate motion of the vehicle along the designated route.

Figure 7:
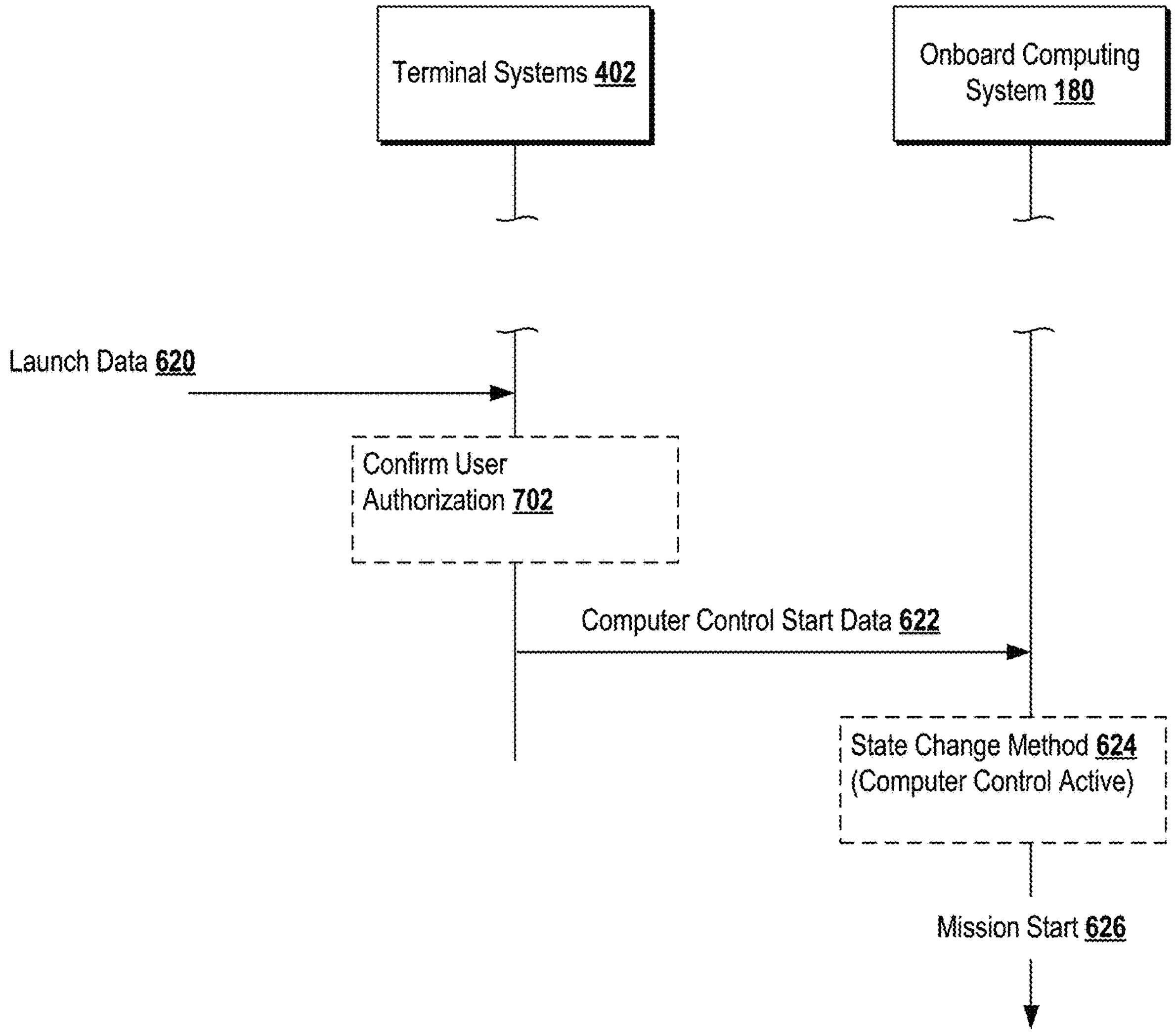
FIG. 7 is a flowchart of an example method for verifying a state change of an autonomous vehicle, according to some implementations of the present disclosure.

FIG. 7 is a communication timeline diagram illustrating an example data flow between terminal system 402 and onboard computing system 180 in an example implementation according to the present disclosure. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of the communications or operations can be performed additionally, or alternatively, by other systems.

In particular, FIG. 7 illustrates an example implementation in which terminal system 402 executes a method 702 to confirm user authorization. Confirming user authentication can include a step-up authorization procedure to ensure that the terminal operator has clearance to perform the launch and that the launch is not inadvertently initiated.

Step-up authorization can include a multi-factor authentication procedure. One factor can include a physical interaction with a device, such as operator device 406 or another device. For instance, one factor can include insertion of a physical passkey into operator device 406 or another device. One factor can include input of a biometric passkey using operator device 406 or another device (e.g., a passkey generated based on a face scan, a fingerprint, etc.). One factor can include providing an input on a separate device within a designated time interval. For instance, launch data 620 can be generated by pressing a button on a first device, and user authorization can be confirmed by pressing another button at a different physical location (e.g., a fixed located spaced apart from launch pad 408) within a provided time interval.

Figure 8:
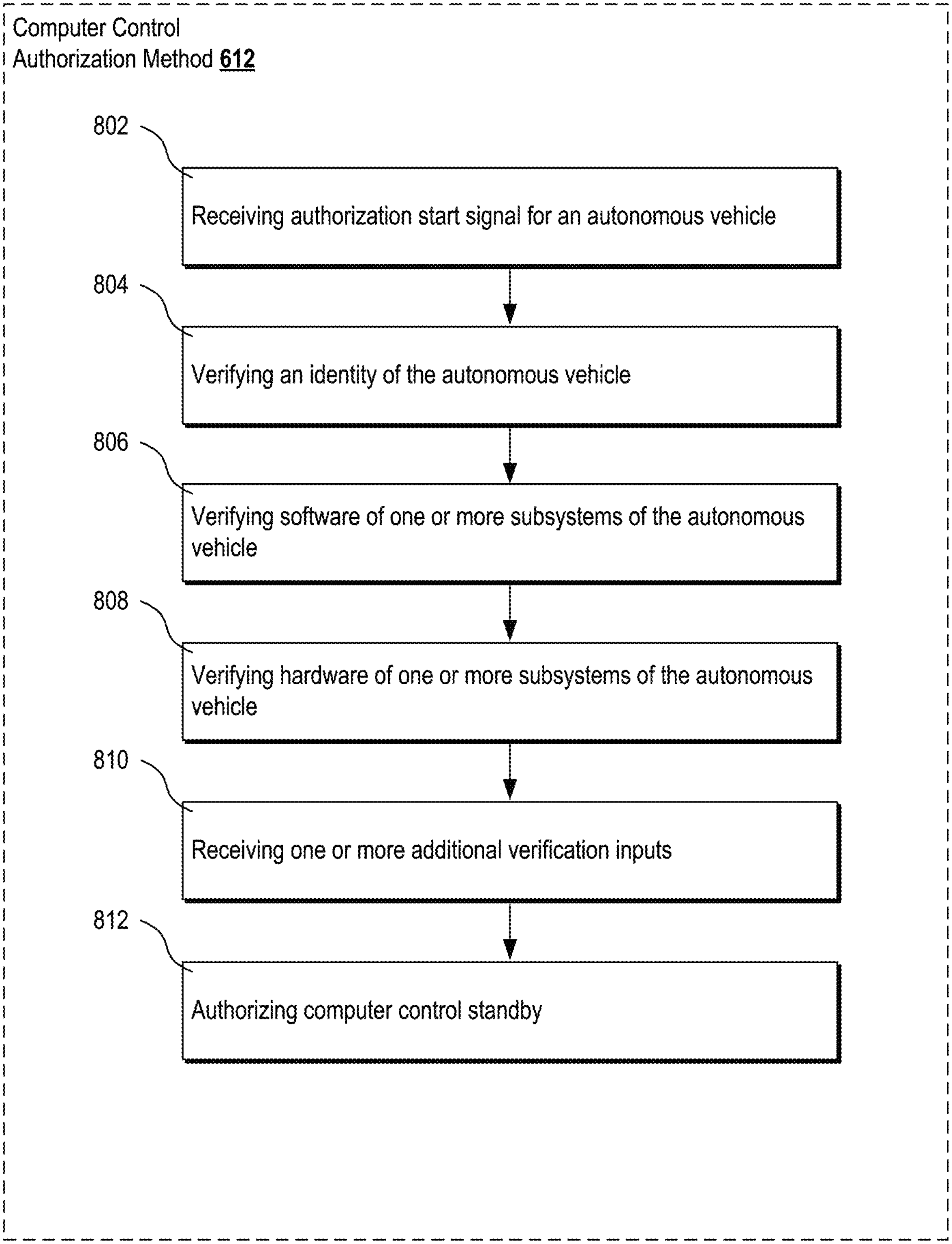
FIG. 8 is a flowchart of an example method for verifying a state change of an autonomous vehicle, according to some implementations of the present disclosure.

FIG. 8 is a flow chart of an example method 612 for determining computer control authorization. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 8 is described with reference to elements/terms described with respect to other systems and figures for exemplary illustrated purposes and is not meant to be limiting. One or more portions of the communications or operations can be performed additionally, or alternatively, by other systems.

At 802, example method 612 can include receiving an authorization start signal for an autonomous vehicle. The authorization start signal can be a trigger 512. The authorization start signal can be based on an interaction with a human-machine interface. For instance, the vehicle can include a button (inside or outside the vehicle) that, when pressed, generates an authorization start signal. This authorization start signal can be relayed to terminal systems 402.

At 804, example method 612 can include verifying an identity of the autonomous vehicle. For instance, verifying the identity of the autonomous vehicle can include comparing an identifier received from the autonomous vehicle to an identifier stored with a mission profile. authenticity (e.g., that the vehicle is indeed the vehicle corresponding to that identifier).

At 806, example method 612 can include verifying software of one or more subsystems of the autonomous vehicle. For instance, verifying software can include comparing version numbers of software loaded on the vehicle to version numbers of the most recent or currently deployed versions in a repository. Verifying software can include determining whether the software is capable of producing valid outputs. Verifying software can include determining whether the software has received valid inputs.

Example method 612 can include, at 806, verification that a control subsystem of the autonomous vehicle is configured to execute a software version specified in a mission profile and that a map subsystem of the autonomous vehicle is configured to execute a map version specified in the mission profile. Example method 612 can include, at 806, verification that the control subsystem of the autonomous vehicle has received a valid goal list.

At 808, example method 612 can include verifying hardware of one or more subsystems of the autonomous vehicle. Verifying hardware of the autonomous vehicle can include determining whether one or more sensors is producing valid outputs. Verifying hardware of the autonomous vehicle can include determining whether one or more actuators can actuate within specification. Verifying hardware of the autonomous vehicle can include verifying: hardware component serial numbers, hardware versions, trusted platform modules, etc.

At 810, example method 612 can include receiving one or more additional verification inputs. For instance, additional verification inputs can be received from an operator device 406. For example, operator device 406 can include a display interface that renders a checklist of action items. Operator device 406 can receive, from an input interface, an indication that one or more of the checklist items have been completed. Based on such indications, operator device 406 can provide additional verification inputs.

At 812, example method 612 can include authorizing computer control standby for the autonomous vehicle.

Figure 9:
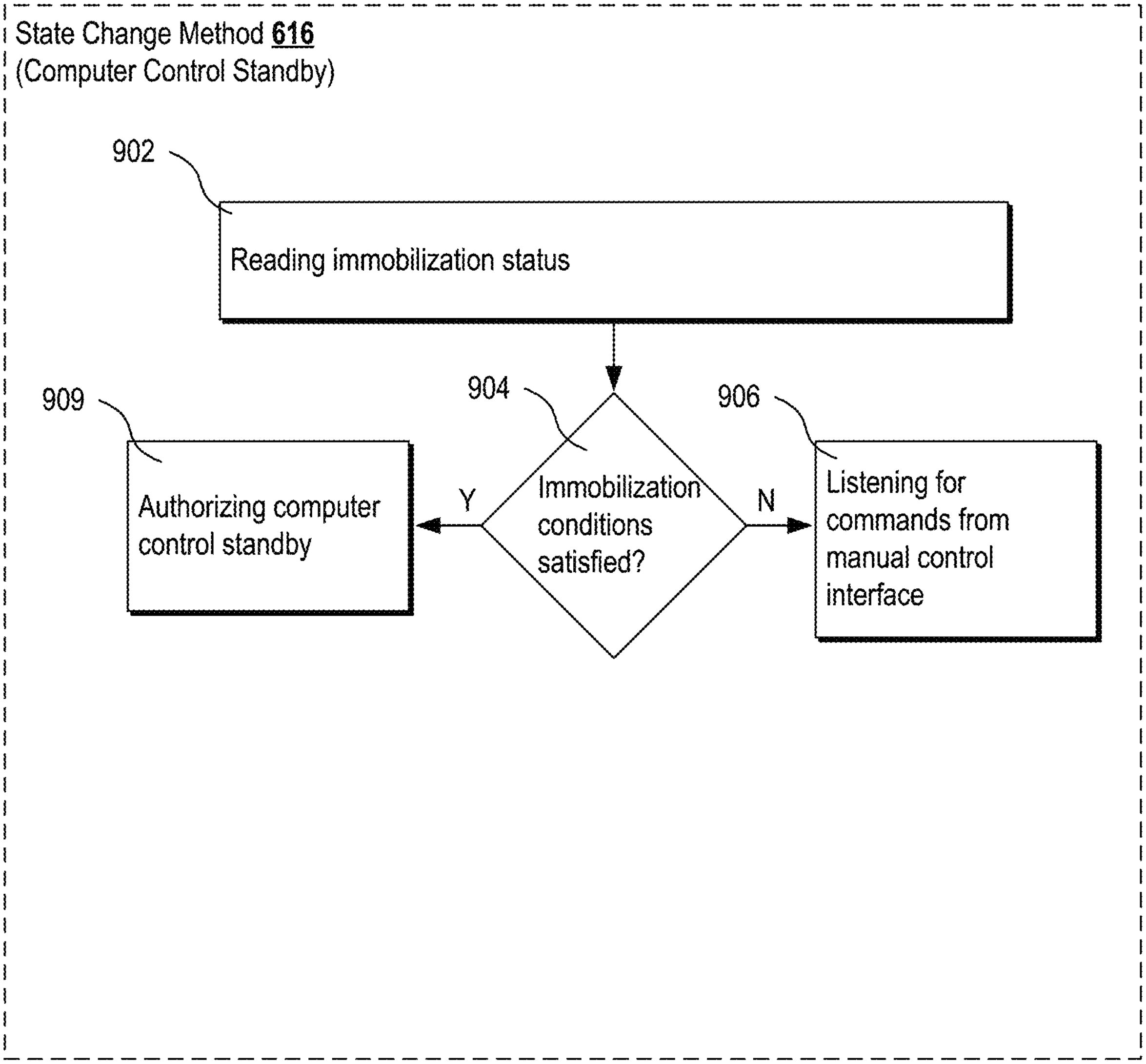
FIG. 9 is a flowchart of an example method for verifying a state change of an autonomous vehicle, according to some implementations of the present disclosure.

FIG. 9 is a flow chart of an example state change method 616 for setting the vehicle operational state to computer control standby. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 9 is described with reference to elements/terms described with respect to other systems and figures for exemplary illustrated purposes and is not meant to be limiting. One or more portions of the communications or operations can be performed additionally, or alternatively, by other systems.

At 902, example state change method 616 can include reading an immobilization status for the vehicle. For example, reading the immobilization status can include reading a status of a parking brake, reading a status of a transmission drive mode (e.g., “drive,” “neutral,” “park,” etc.), reading a rotational encoder or other motion sensor, etc.

At 904, example state change method 616 can include determining whether one or more immobilization conditions are satisfied. For example, an immobilization condition can include the parking brake being engaged. An immobilization condition can include the transmission being in a “park” drive mode. An immobilization condition can include the actual detected vehicle speed being zero.

If the immobilization conditions are not satisfied, at 906, example state change method 616 can include listening for commands from a manual control interface. For example, a manual control interface can be onboard the vehicle. A terminal operator can engage the parking brake or shift the transmission into neutral.

If the immobilization conditions are satisfied, at 908, example state change method 616 can include authorizing computer control standby.

Figure 10:
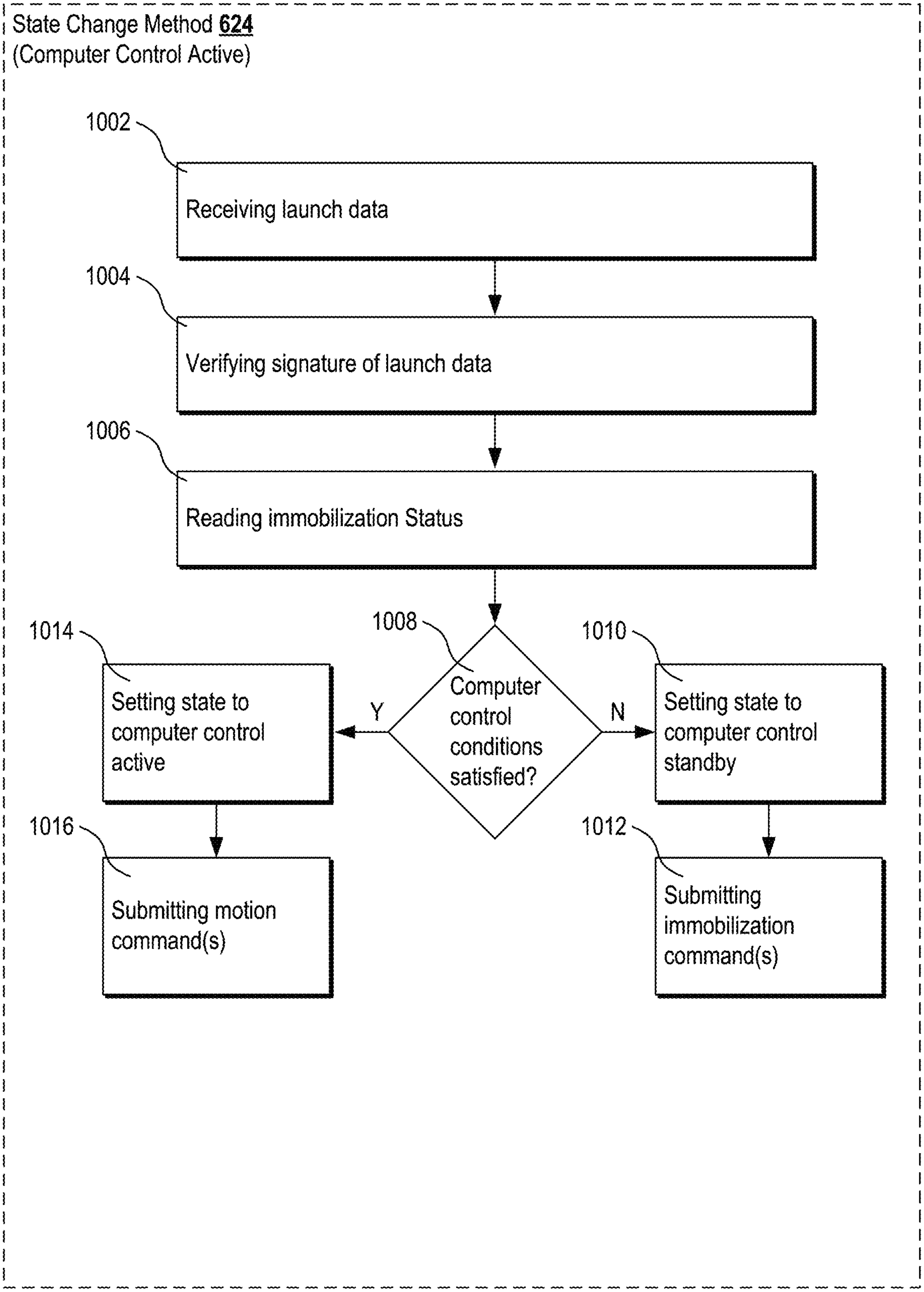
FIG. 10 is a communication diagram for an example system for verifying a state change of an autonomous vehicle, according to some implementations of the present disclosure.

FIG. 10 is a flow chart of an example state change method 624 for setting the vehicle operational state to computer control active. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 10 is described with reference to elements/terms described with respect to other systems and figures for exemplary illustrated purposes and is not meant to be limiting. One or more portions of the communications or operations can be performed additionally, or alternatively, by other systems.

At 1002, example state change method 624 can include receiving launch data (e.g., launch data 620 or computer control start data 622).

At 1004, example state change method 624 can include verifying a signature of the launch data. For instance, launch data 620 or computer control start data 622 can be cryptographically signed to authenticate a source of launch data 620 or computer control start data 622. In an example, launch data 620 or computer control start data 622 can include a signed nonce issued by onboard computing system 180 (e.g., issued periodically to ensure nonce is not stale).

At 1006, example state change method 624 can include reading an immobilization status (e.g., as in example state change method 616 at 902).

At 1008, example state change method 624 can include determining whether one or more computer control conditions are satisfied. Computer control conditions can include those prerequisites described above with respect to the state machine shown in FIG. 5. In general, one or more prerequisites can be checked at an early stage of vehicle preparation in addition to or in lieu of checks performed upon attempt to change states into computer control active state 518. Here, at 1008, one or more prerequisites for computer control active state 518 can be checked by referring back to a prior checkpoint and determining whether any conditions affecting the prerequisites have changed. In this manner, for instance, fault conditions or other impediments to launch can be determined at an early stage prior to performing one or more other vehicle preparation operations. It is to be understood however that here, at 1008, prerequisites can be checked anew to be sure of utmost recency of certain prerequisite confirmations prior to launch.

For example, terminal systems 402 or onboard computing system 180 can check a map version. In an example, terminal systems 402 or onboard computing system 180 can periodically poll onboard computing system 180 for its map version (or refer to a stored status of its map version) and poll a map repository to confirm that the vehicle has the most recent map version. Upon receipt of launch data 620 or computer control start data 622, terminal systems 402 or onboard computing system 180 can conduct another check.

For example, terminal systems 402 or onboard computing system 180 can check a software version for one or more components of autonomy systems 200 (e.g., a perception system version, a localization system version, a motion planning system version, a control system version, etc.). In an example, terminal systems 402 can periodically poll onboard computing system 180 for its software versions (or refer to a stored status of its software versions) and poll a software repository to confirm that the vehicle has the most recent software versions. Upon receipt of launch data 620 or computer control start data 622, terminal systems 402 or onboard computing system 180 can conduct another check.

For example, terminal systems 402 or onboard computing system 180 can check a service hold state. In an example, terminal systems 402 can periodically poll onboard computing system 180 or a service hold database for any outstanding service holds for the vehicle (e.g., outstanding maintenance, updates, recalls, etc.). Upon receipt of launch data 620 or computer control start data 622, terminal systems 402 or onboard computing system 180 can conduct another check.

For example, terminal systems 402 or onboard computing system 180 can check a goal list state. In an example, terminal systems 402 can periodically poll onboard computing system 180 or a mission database for a current goal list for the vehicle and confirm whether the goal locations are valid and reachable. Upon receipt of launch data 620 or computer control start data 622, terminal systems 402 or onboard computing system 180 can conduct another check.

If the computer control conditions are not satisfied, at 1010, example state change method 624 can include setting an operational state of the vehicle to computer control standby.

If the computer control conditions are not satisfied, at 1012, example state change method 624 can include submitting immobilization commands. The vehicle may be already immobilized. If immobilization commands have already been entered by the system, example state change method 624 at 1012 can include confirming that immobilization commands have already been entered by the system.

If the computer control conditions are satisfied, at 1014, example state change method 624 can include setting an operational state of the vehicle to computer control active.

If the computer control conditions are satisfied, at 1016, example state change method 624 can include submitting motion commands to initiate mission start 626.

Figure 11:
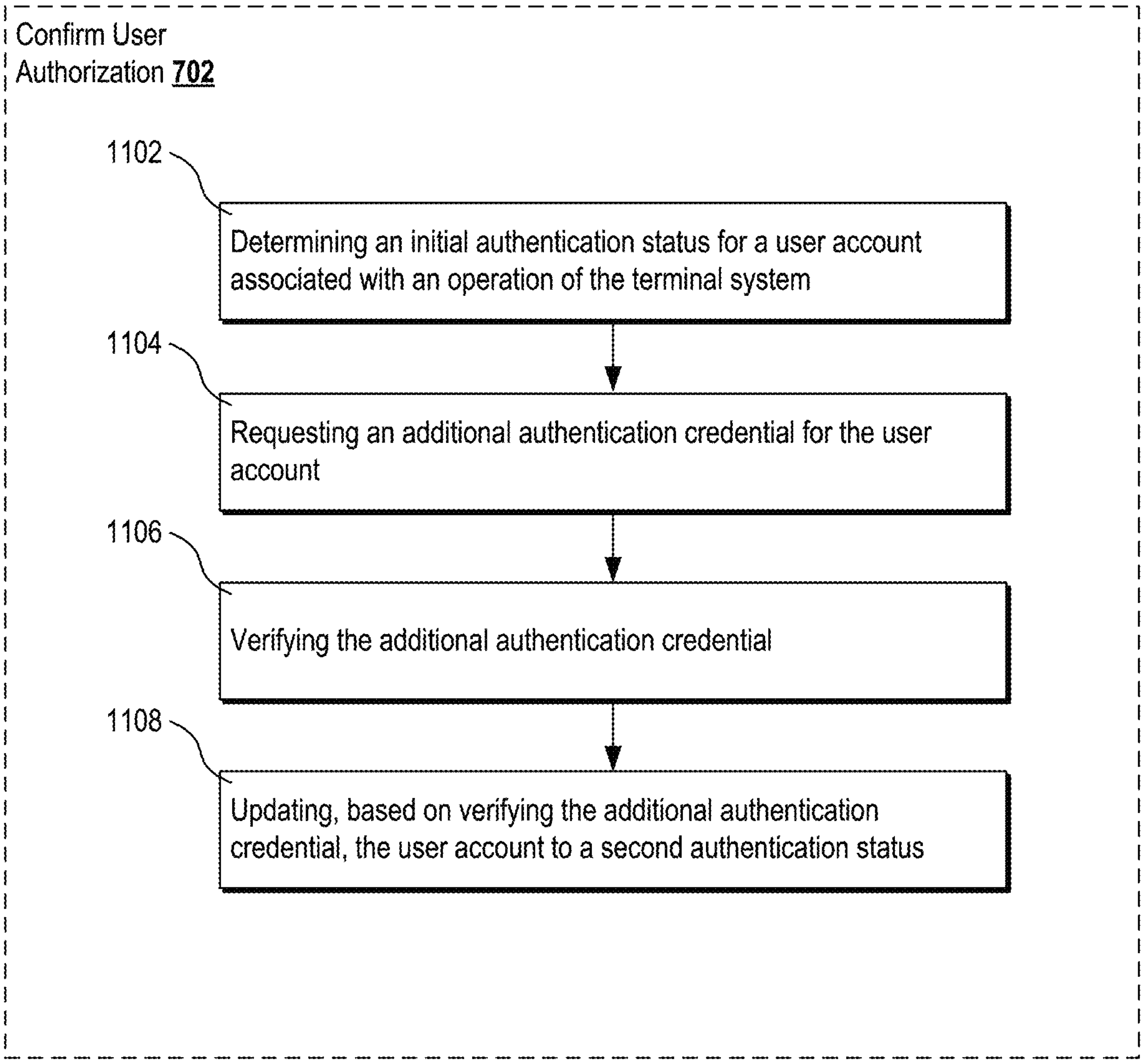
FIG. 11 is a flowchart of an example method for verifying a state change of an autonomous vehicle, according to some implementations of the present disclosure.

FIG. 11 is a flow chart of an example method 1002 for confirming user authorization. The Figure depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. The Figure is described with reference to elements/terms described with respect to other systems and figures for exemplary illustrated purposes and is not meant to be limiting. One or more portions of the communications or operations can be performed additionally, or alternatively, by other systems.

At 1102, example method 1002 can include determining an initial authorization status for a user account associated with an operation of the terminal system. The initial authorization status can correspond to a default, signed-in state. For example, the user can enter one or more credentials (e.g., using single-factor or multi-factor login procedures) to enter the initial authorization status. This can occur at sign-on (e.g., at the beginning of each workday) and is not tied to any specific prior interaction.

At 1104, example method 1002 can include requesting an additional authentical credential for the user account. The additional authentication credential can be the same or different from those used to sign-on initially. For example, step-up authentication can proceed by using dedicated credentials (e.g., password, passkey, etc.) to initiate a launch procedure. Step-up authentication can proceed by using the same credentials, entered anew.

At 1106, example method 1002 can include verifying the additional authentication credential.

At 1108, example method 1002 can include updating, based on verifying the additional authentication credential, the user account to a second authentication status.

Figure 12:
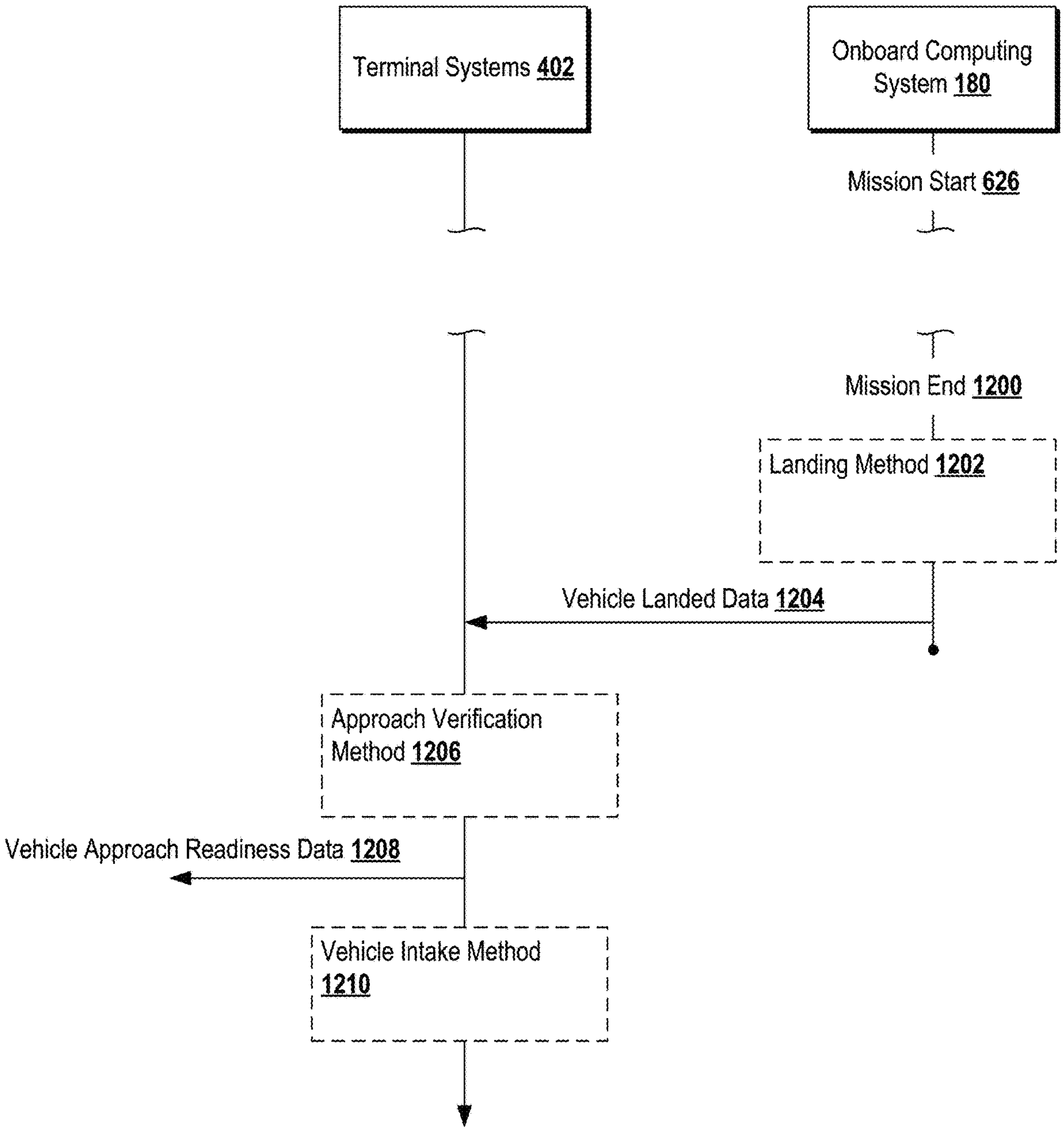
FIG. 12 is a communication diagram for an example system for verifying a state change of an autonomous vehicle, according to some implementations of the present disclosure.

FIG. 12 is a communication timeline diagram illustrating an example data flow between terminal system 402 and onboard computing system 180 for landing an autonomous vehicle according to an example implementation according to the present disclosure. The Figure depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. The Figure is described with reference to elements/terms described with respect to other systems and figures for exemplary illustrated purposes and is not meant to be limiting. One or more portions of the communications or operations can be performed additionally, or alternatively, by other systems.

Landing an autonomous vehicle can occur at some time after mission start 626. The vehicle can execute its mission until mission end 1200, which can be a completion of a route, or a return to a terminal after completion of a route. The vehicle can autonomously execute a landing method 1202 to land on the landing pad (e.g., launch pad 408). Upon completion of landing method 1202, the vehicle can transmit to terminal systems 402 vehicle landed data 1204, which can notify terminal systems 402 that landing is complete. Terminal systems 402 can execute approach verification method 1206 to confirm that the vehicle is in a condition to be approached by a terminal operator. Upon confirmation, terminal systems 402 can output to an operator device 406 vehicle approach readiness data 1208, which can indicate a readiness of the landed vehicle to be approached. A terminal operator can approach the vehicle and initiate performance of vehicle intake method 1210.

Landing method 1202 can include navigating within a terminal location to a landing pad area. A landing pad area can be the same as a launch pad area or can be different (e.g., in a different section of a terminal location). Landing method 1202 can include halting the vehicle within a bounding box associated with the landing pad area. Landing method 1202 can include engaging a parking brake. Landing method 1202 can include shifting a transmission drive mode into "park."

Vehicle landed data 1204 can include an indication that landing method 1202 has been successfully completed. Vehicle landed data 1204 can include parking brake engagement status data, transmission drive mode data, current vehicle speed data, etc. Upon failure of landing method 1202, vehicle landed data 1204 can include an indication that the vehicle is not landed.

Approach verification method 1206 can include confirming that vehicle landed data 1204 indicates a fully landed state of the vehicle (e.g., that the vehicle is immobilized and in computer control standby state 514 or no authorization state 500).

Approach verification method 1206 can include verifying that vehicle landed data corresponds to a vehicle in a particular landing area. For instance, a terminal location may have multiple landing areas, some landing areas may contain vehicles that are fully landed, and some landing areas may contain vehicles that are not fully landed. Approach verification method 1206 can include confirming, using vehicle landed data 1204 or other sensors (e.g., camera external to or internal to vehicle, GPS onboard vehicle, etc.), that the vehicle with which terminal systems 402 is communicating (the vehicle containing onboard computing system 180) is indeed the vehicle present in a designated landing location that is the subject of the current landing procedure. For instance, landing areas can be numbered or otherwise distinguished so that they can be clearly linked to a specific vehicle. A camera device onboard the vehicle can read a number painted on the landing area and relay that number to terminal systems 402. A camera device in the terminal with a lens aimed at a particular landing area can read a license plate or other identifying mark to confirm that the expected vehicle is within the landing area.

Upon successful completion of approach verification method 1206, terminal systems 402 can output vehicle approach readiness data 1208. Vehicle approach readiness data 1208 can include data signaling that the vehicle is approachable.

Vehicle approach readiness data 1208 can be published for communication to different systems. For instance, operator devices 406 can display or otherwise indicate approach readiness data for one or more vehicles. An output device on the vehicle can indicate an approach readiness data (e.g., an audible alarm or announcement in one or more languages, a visual display, etc.). An output device embedded in a terminal location infrastructure can indicate an approach readiness data (e.g., an audible alarm or announcement in one or more languages, a display associated with a landing pad, such as a set of indicator lights, a screen, etc.).

Operator device 406 can receive vehicle approach readiness data 1208 and display an indication that the vehicle is approachable. Operator device 406 can receive vehicle approach readiness data 1208 and display an indication that the vehicle is landed. Operator device 406 can receive vehicle approach readiness data 1208 and display an indication that the state of the vehicle is in computer control standby state 514 or no authorization state 500. Operator device 406 can receive vehicle approach readiness data 1208 and display an indication that a parking brake is engaged (e.g., on the vehicle, on a trailer attached to the vehicle, etc.).

Vehicle intake method 1210 can include relocating the vehicle for unloading cargo, conducting maintenance, cycling for a next mission, etc.

Figure 13:
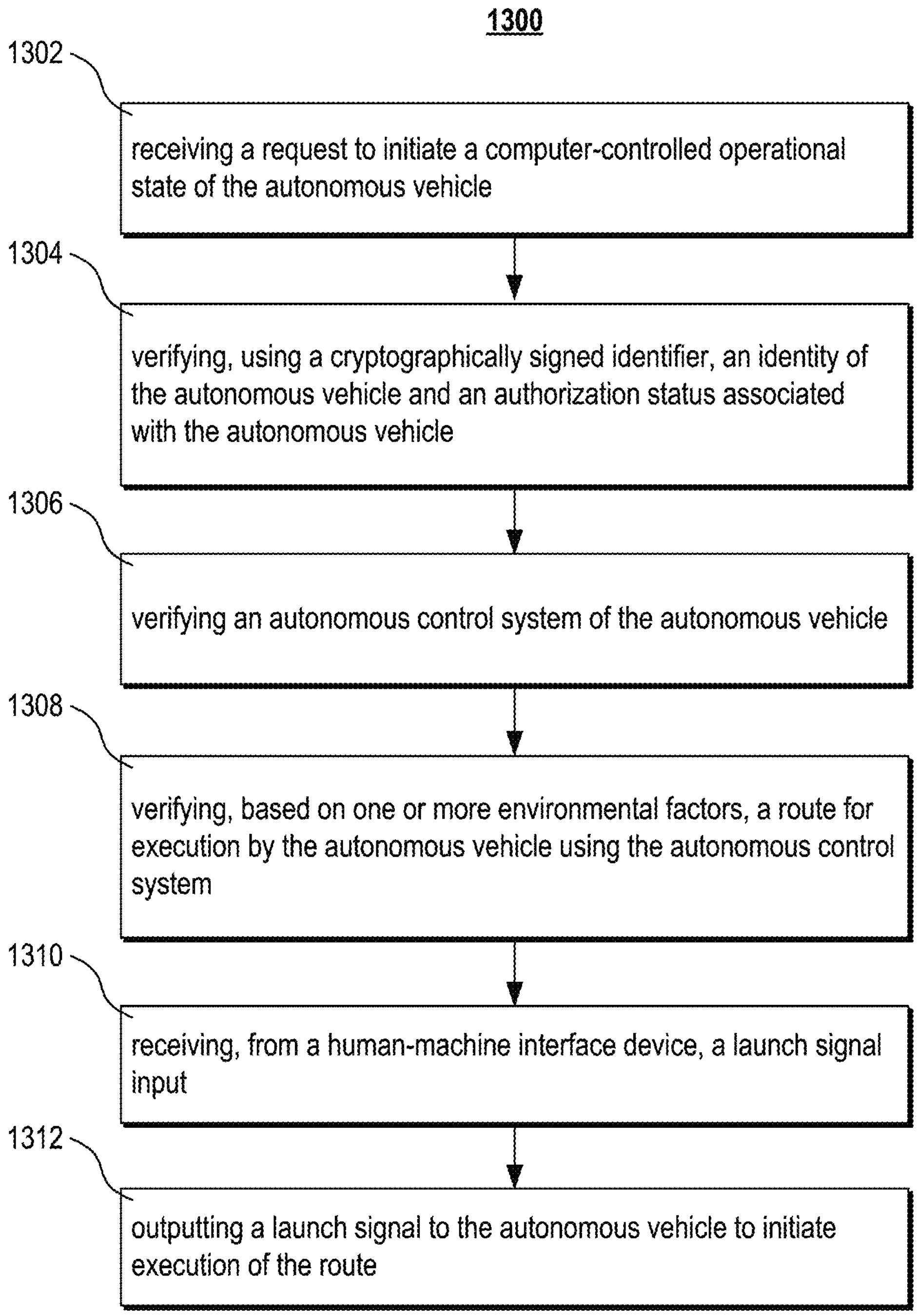
FIG. 13 is a flowchart of an example method for verifying a state change of an autonomous vehicle, according to some implementations of the present disclosure.

FIG. 13 is a flowchart of an example method 1300 for initiating an operational state change of an autonomous vehicle to cause the autonomous vehicle to launch a mission according to aspects of the present disclosure. One or more portions of example method 1300 can be implemented by the computing systems described with reference to the other figures (e.g., remote system 160, state change system 400, terminal systems 402, first computing system 20, second computing system 40, or any other system described with respect to FIGS. 1 to 16), optionally in cooperation with one or more other systems (e.g., autonomous platform 110, vehicle computing system 180). Each respective portion of example method 1300 can be performed by any (or any combination) of one or more computing devices. Moreover, one or more portions of example method 1300 can be implemented on the hardware components of the devices described herein (e.g., verification server 404, operator device 406, networks 170, networks 60, computing device(s) 21, computing device(s) 41).

For instance, in an example, FIG. 13 relates to operations performed by one or more verification servers 404.

FIG. 13 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 13 is described with reference to elements/terms described with respect to other systems and figures for exemplary illustrated purposes and is not meant to be limiting. One or more portions of example method 1300 can be performed additionally, or alternatively, by other systems.

At 1302, example method 1300 can include (a) receiving a request to initiate a computer-controlled operational state of the autonomous vehicle. For example, the computer-controlled operational state can be a computer control standby state 514 or computer control active state 518. The request can correspond to request data 602. For instance, a queuing system can request a next vehicle to launch based on a schedule of vehicle launches. An operator device can request a next vehicle to launch based on a list of next vehicles to launch by communicating a selection to terminal systems 402.

In an example, example method 1300 can include receiving a request to initiate a computer-controlled operational state of the autonomous vehicle, the request including a mission profile for the mission identifying (i) the autonomous vehicle, (ii) a route for execution by the autonomous vehicle, the route including a goal list, (iii) a software version, and (iv) a map version. The request can correspond to request data 602. For instance, a queuing system can request a next vehicle to launch based on a schedule of vehicle launches. An operator device can request a next vehicle to launch based on a list of next vehicles to launch by communicating a selection to terminal systems 402.

At 1304, example method 1300 can include (b) verifying, using a cryptographically signed identifier, an identity of the autonomous vehicle and an authorization status associated with the autonomous vehicle. For instance, verifying the identity of the autonomous vehicle can include comparing an identifier received from the autonomous vehicle to an identifier stored in a mission profile. The identifier received from the autonomous vehicle can be cryptographically signed to ensure authenticity (e.g., to ensure that the vehicle is indeed the vehicle corresponding to that identifier). Verification of the identity can be performed by terminal systems 402 (e.g., in a method 612). Verification of the authorization status can include determining that the identified vehicle is assigned to launch and that the vehicle is authorized to operate autonomously on its mission.

In an example, example method 1300 can include verifying, using a cryptographically signed identifier, an identity of the autonomous vehicle and an authorization status associated with the autonomous vehicle. For instance, verifying the identity of the autonomous vehicle can include comparing an identifier received from the autonomous vehicle to an identifier stored with a mission profile. The identifier received from the autonomous vehicle can be cryptographically signed to ensure authenticity (e.g., that the vehicle is indeed the vehicle corresponding to that identifier). Verification of the identity can be performed by terminal systems 402 (e.g., in a method 612). Verification of the authorization status can include determining that the identified vehicle is assigned to launch and that the vehicle is authorized to operate autonomously on its mission.

At 1306, example method 1300 can include (c) verifying an autonomous control system of the autonomous vehicle. Verifying the autonomous control system can include verifying one or more subsystems of the autonomous control system (e.g., one or more components of autonomy systems 200). Verifying the autonomous control system can include operations 806, 808, or 810 of method 612. For instance, verifying the autonomous control system can include verifying software versions, hardware identifiers, map versions, system operability, etc.

In an example, example method 1300 can include verifying that a control subsystem of the autonomous vehicle is configured to execute the software version and that a map subsystem of the autonomous vehicle is configured to execute the map version. For example, the control subsystem can include any one or more components of autonomy systems 200, including localization 230, perception 240, planning 250, and control 260; remote assistance system 270; communication interfaces 206; sensors 202; or platform control devices 212. A map subsystem can include localization 230 or a dedicated map processing subsystem.

In an example, example method 1300 can include verifying that the control subsystem of the autonomous vehicle has received the goal list.

At 1308, example method 1300 can include (d) verifying, based on one or more environmental factors, a route for execution by the autonomous vehicle using the autonomous control system. Verifying the route for execution can include verifying a goal list received for a mission. In an example, the route can be loaded into memory of the autonomous vehicle during or prior to launch. The stored route can be verified for data integrity to confirm that the transfer was performed correctly. The route can be verified by evaluating the route against one or more operational constraints of the autonomous vehicle. For example, the operational requirements of traversing a given route can vary over time. Traversing a route in low traffic on a clear day at noon can require different operational capacities as compared to traversing the same route at night in the rain in heavy traffic. Verifying the route can include determining one or more environmental factors (e.g., weather, traffic, road condition, internal or external bulletins, etc.) and determining that the autonomous vehicle can execute the route using the autonomous control system while satisfying one or more operational constraints of the autonomous vehicle.

In an example, example method 1300 can include verifying that one or more environmental conditions associated with the route for execution by the autonomous vehicle satisfy one or more criteria. Verifying the route can include evaluating the route against one or more operational constraints of the autonomous vehicle.

At 1310, example method 1300 can include (e) receiving, from a human-machine interface device, a launch signal input. The launch signal input can correspond to launch data 620. The launch signal input can be initiated by a detected interaction at the human-machine interface device. The human-machine interface device can be, for instance, operator device 406. The human-machine interface device can be an embedded device fixed to a stationary launch control station.

At 1312, example method 1300 can include (f) outputting a launch signal to the autonomous vehicle to initiate execution of the route. For example, terminal systems 402 can output computer control start data 622 to cause the vehicle to initiate a state transition to computer control active 518 and to thereby begin execution of the mission.

In an example, example method 1300 can include transmitting a launch signal to the autonomous vehicle to initiate execution of the route, wherein the launch signal is output responsive to the launch signal input and conditioned on successfully verifying the identity and the authorization status and verifying the performance of one or more operations, such as portions of example method 1300. For instance, the launch signal can be output responsive to the launch signal input and conditioned on successfully verifying the identity and the authorization status and verifying the performance of 1306 and 1308. For example, terminal systems 402 can transmit computer control start data 622 to onboard computing system 180 to cause the vehicle to initiate a state transition to computer control active 518 and to thereby begin execution of the mission. The transmission of computer control start data 622 can be based on successful completion of the preceding operations and methods from the receipt of request data 602 to the receipt of computer control ready data 618.

In some implementations of example method 1300, the human-machine interface device is external to the autonomous vehicle. For example, the human-interface device can be a stationary device located at a designated location away from the vehicle. The human-interface device can be a mobile device that is only effective to initiate launch if external to the vehicle (e.g., based on geofencing).

In some implementations of example method 1300, the human-machine interface device is located at a first location. In some implementations of example method 1300, the autonomous vehicle is launched from a launch pad at a second location that is different from the first location.

In some implementations, example method 1300 includes determining a location of the autonomous vehicle. In some implementations, the launch signal is conditioned on the location of the autonomous vehicle being a designated launch location. For example, terminal systems 402 can enforce a geofence that prevents one or more state transitions (e.g., a transition into computer control standby state 514 or computer control active state 518) for a vehicle that is not within a boundary of a launch pad area.

In some implementations, example method 1300 includes updating, in association with the launch signal input, an authentication status of a user of the human-machine interface device. For example, an authentication update method can proceed as in method 1002. For instance, updating user authentication can include a step-up authorization procedure to ensure that the terminal operator has clearance to perform the launch and that the launch is not inadvertently initiated.

In some implementations of example method 1300, updating the authentication status includes requesting, from the human-machine interface device, an authentication credential. For instance, example method 1002 can include requesting an additional authentical credential for the user account.

In some implementations of example method 1300, the authentication credential is an additional authentication credential different from an initial authentication credential used to initiate a user session on the human-machine interface device. The additional authentication credential can be the same or different from those used to sign-on initially. For example, step-up authentication can proceed by using dedicated credentials (e.g., password, passkey, etc.) to initiate a launch procedure. Step-up authentication can proceed by using the same credentials, entered anew. In some implementations of example method 1300, the authentication credential is based on a physical passkey.

In some implementations, example method 1300 includes obtaining, from the autonomous vehicles, sensor calibration data. In some implementations, example method 1300 includes determining, based on the sensor calibration data, a calibration status of a component of the autonomous control system.

In some implementations of example method 1300, the component is a perception system of the autonomous vehicle. In some implementations of example method 1300, the sensor calibration data includes test detections obtained by the autonomous vehicle of one or more calibration objects during a calibration routine.

In some implementations of example method 1300, the calibration routine includes causing the autonomous vehicle to move with respect to the one or more calibration objects. In some implementations of example method 1300, the calibration routine includes recording perception data descriptive of the one or more calibration objects using the perception system. In some implementations of example method 1300, the calibration routine includes comparing the recorded perception data against reference data descriptive of the one or more calibration objects. For instance, a terminal location can include a calibration course or other infrastructure with known detectable attributes that can provide a reference for evaluating a quality of captured sensor data. A terminal operator can manually control a vehicle to navigate through the calibration course. A terminal operator can initiate the vehicle's autonomous navigation through the calibration course.

In some implementations of example method 1300, the component is a localization system of the autonomous vehicle. In some implementations of example method 1300, the sensor calibration data includes pose data obtained by the autonomous vehicle. In some implementations of example method 1300, the calibration routine includes causing the autonomous vehicle to move within a calibration environment. In some implementations of example method 1300, the calibration routine includes localizing the autonomous vehicle within a map of the calibration environment using the localization system. In some implementations of example method 1300, the calibration routine includes comparing the localization of the autonomous vehicle within the map against reference data descriptive of a reference location of the autonomous vehicle within the calibration environment.

In some implementations of example method 1300, (e) includes determining that one or more environmental conditions associated with the route do not exceed a vehicle capability.

In some implementations of example method 1300, the one or more environmental conditions comprise a weather condition along the route. For instance, the system can evaluate a capability of the vehicle to navigate in inclement weather, such as rain, fog, snow, ice, etc.

In some implementations of example method 1300, the one or more environmental conditions comprise a traffic condition along the route. For instance, the system can evaluate a capability of the vehicle to navigate in heavy traffic, construction detours, etc.

In some implementations of example method 1300, the one or more environmental conditions comprise an infrastructure condition along the route. For instance, the system can evaluate a capability of the vehicle to navigate in construction zones, lane closures (e.g., temporary reversals of lane directions, etc.).

In some implementations of example method 1300, the one or more environmental conditions include a predicted environmental condition at a future time. For instance, any one of these example evaluations can be based on a current condition or a future condition at some point during the mission. For example, a mission can span one or multiple hours, and conditions may change over time. As such, the entire mission duration may be evaluated to determine if the entire mission is within the vehicle's capabilities (e.g., if at any point a capability is likely to be exceeded).

In some implementations of example method 1300, the component includes a perception system. In some implementations of example method 1300, the component includes a motion planning system.

In some implementations of example method 1300, the vehicle capability includes a regulatory restriction on autonomous vehicle operation in the one or more environmental conditions. For instance, in some jurisdictions, operation of an autonomous vehicle may be restricted to certain subsets of favorable weather conditions in which certain sensors may perform better (e.g., avoiding precipitation, darkness, etc.).

Figure 14:
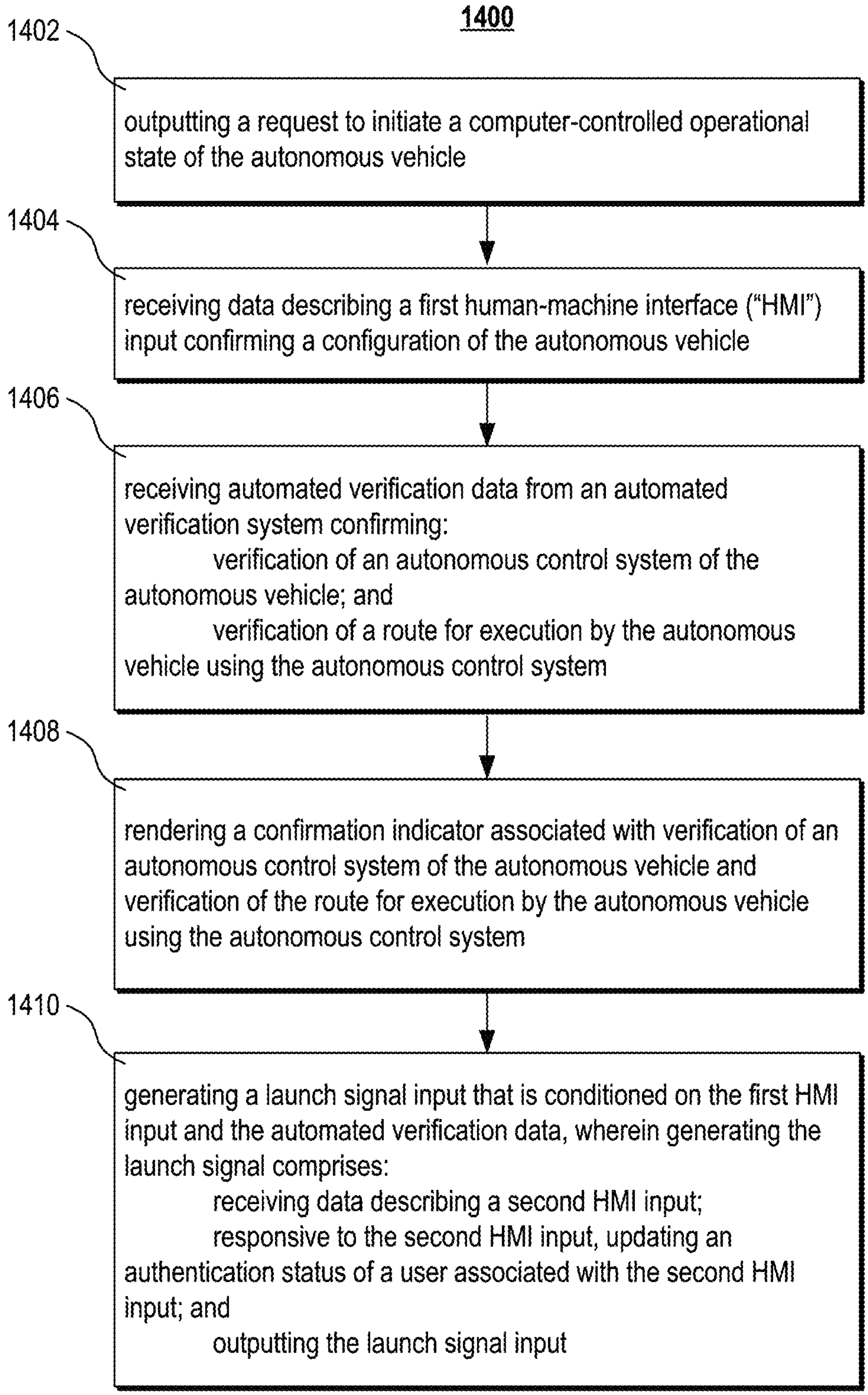
FIG. 14 is a flowchart of an example method for verifying a state change of an autonomous vehicle, according to some implementations of the present disclosure.

FIG. 14 is a flowchart of an example method 1400 for verifying operational state changes of an autonomous vehicle to cause the autonomous vehicle to launch a mission according to aspects of the present disclosure. One or more portions of example method 1400 can be implemented by the computing systems described with reference to the other figures (e.g., remote system 160, state change system 400, terminal systems 402, first computing system 20, second computing system 40, or any other system described with respect to FIGS. 1 to 16), optionally in cooperation with one or more other systems (e.g., autonomous platform 110, vehicle computing system 180). Each respective portion of example method 1400 can be performed by any (or any combination) of one or more computing devices. Moreover, one or more portions of example method 1400 can be implemented on the hardware components of the devices described herein (e.g., verification server 404, operator device 406, networks 170, networks 60, computing device(s) 21, computing device(s) 41).

For instance, in an example, FIG. 14 relates to operations performed by one or more operator devices 406.

FIG. 14 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 14 is described with reference to elements/terms described with respect to other systems and figures for exemplary illustrated purposes and is not meant to be limiting. One or more portions of example method 1400 can be performed additionally, or alternatively, by other systems.

At 1402, example method 1400 can include (a) outputting a request to initiate a computer-controlled operational state of the autonomous vehicle. For example, the computer-controlled operational state can be a computer control standby state 514 or computer control active state 518. The request can correspond to request data 602. For instance, a queuing system can request a next vehicle to launch based on a schedule of vehicle launches. An operator device can request a next vehicle to launch based on a list of next vehicles to launch by communicating a selection to terminal systems 402.

In some implementations of example method 1400, the request can include a mission profile for the mission identifying (i) the autonomous vehicle, (ii) a route for execution by the autonomous vehicle, the route including a goal list, (iii) a software version, and (iv) a map version.

At 1404, example method 1400 can include (b) receiving data describing a first human-machine interface ("HMI") input confirming a configuration of the autonomous vehicle. For example, the first HMI input can correspond to a completion of a checklist interactive workflow on operator device 406. The first HMI input can correspond to a trigger 512 to initiate a state transition into computer control standby state 514.

At 1406, example method 1400 can include (c) receiving automated verification data from an automated verification system. For instance, terminal systems 402 can execute one or more verification operations in an automated fashion (e.g., without terminal operator input, by guiding and soliciting terminal operator input, etc.), such as operations 804, 806, 808, or 810 of computer control authorization method 612. In some implementations of example method 1400, the automated verification data confirms verification of an autonomous control system of the autonomous vehicle. In some implementations of example method 1400, the automated verification data confirms verification of a route for execution by the autonomous vehicle using the autonomous control system.

In some implementations of example method 1400, the automated verification data confirms verification that a control subsystem of the autonomous vehicle is configured to execute the software version and that a map subsystem of the autonomous vehicle is configured to execute the map version. In some implementations of example method 1400, the automated verification data confirms verification that the control subsystem of the autonomous vehicle has received the goal list. In some implementations of example method 1400, the automated verification data confirms verification that one or more environmental conditions associated with the route for execution by the autonomous vehicle satisfy one or more criteria.

At 1408, example method 1400 can include (d) rendering a confirmation indicator associated with verification of an autonomous control system of the autonomous vehicle and verification of the route for execution by the autonomous vehicle using the autonomous control system. For instance, an operator device 406 can render, on a display, the confirmation indicator in a mobile application interface. An operator device 406 can render, on a display, the confirmation indicator on a panel of indicator lights. Terminal systems 402 can render, on a display, the confirmation indicator in associated with a launch pad area.

At 1410, example method 1400 can include (e) generating a launch signal input that is conditioned on the first HMI input and the automated verification data. For instance, an operator device 406 can generate a launch signal input by providing an interactive interface (e.g., a physical or digital button) and receiving an interaction with the interactive interface. The provision of the interactive interface can be triggered based on determining that the first HMI input and the automated verification data have been confirmed.

In some implementations of example method 1400, generating the launch signal input includes receiving data describing a second HMI input. For instance, the second HMI input can be the interaction received at the interactive interface (e.g., pressing and holding a "launch" button).

In some implementations of example method 1400, generating the launch signal input includes, responsive to the second HMI input, updating an authentication status of a user associated with the second HMI input. For instance, updating user authentication can include a step-up authorization procedure to ensure that the terminal operator has clearance to perform the launch and that the launch is not inadvertently initiated. For example, step-up authentication can proceed by using dedicated credentials (e.g., password, passkey, etc.) to initiate a launch procedure. Step-up authentication can proceed by using the same credentials, entered anew.

In some implementations of example method 1400, generating the launch signal input includes outputting the launch signal input. In some implementations of example method 1400, the launch signal input is configured for transmission to a launch system to initiate launch of the autonomous vehicle on the route.

In some implementations of example method 1400, the second HMI input is received from an HMI that is external to the autonomous vehicle. For instance, a terminal facility can provide an HMI in a location different from the launch pad location (e.g., spaced a distance away from).

In some implementations of example method 1400, the first HMI input is received from a different HMI from the second HMI input. For example, a first HMI input can be received via a button within a cabin of a vehicle, and a second HMI input can be received via an operator device (e.g., a mobile device, a stationary device).

In some implementations of example method 1400, the launch of the autonomous vehicle is associated with a designated launch location. In some implementations of example method 1400, the second HMI input is received from a second HMI in a designated control station at a second location that is different from the designated launch location.

In some implementations of example method 1400, the first HMI input is received from a first HMI integrated into a mobile device (e.g., an operator device 406). In some implementations of example method 1400, the second HMI input is received from a second HMI integrated into a mobile device (e.g., an operator device 406).

In some implementations of example method 1400, (a) is conditioned on an initial authentication status of the user. For instance, a user may sign on to a user session on an operator device using secure credentials. This initial sign-on can provide an initial authentication status.

In some implementations of example method 1400, updating the authentication status of the user includes verifying an authentication credential associated with the method. The authentication credential can be the same or different from those used to sign on initially. For example, step-up authentication can proceed by using dedicated credentials (e.g., password, passkey, etc.) to initiate a launch procedure. Step-up authentication can proceed by using the same credentials, entered anew.

In some implementations of example method 1400, updating the authentication status of the user includes using a passkey to authenticate a user account associated with the second HMI input. In some implementations of example method 1400, the passkey includes a physical passkey. In some implementations of example method 1400, the passkey includes a biometric-based passkey (e.g., a passkey generated based on a face scan, a fingerprint, etc.).

Figure 15:
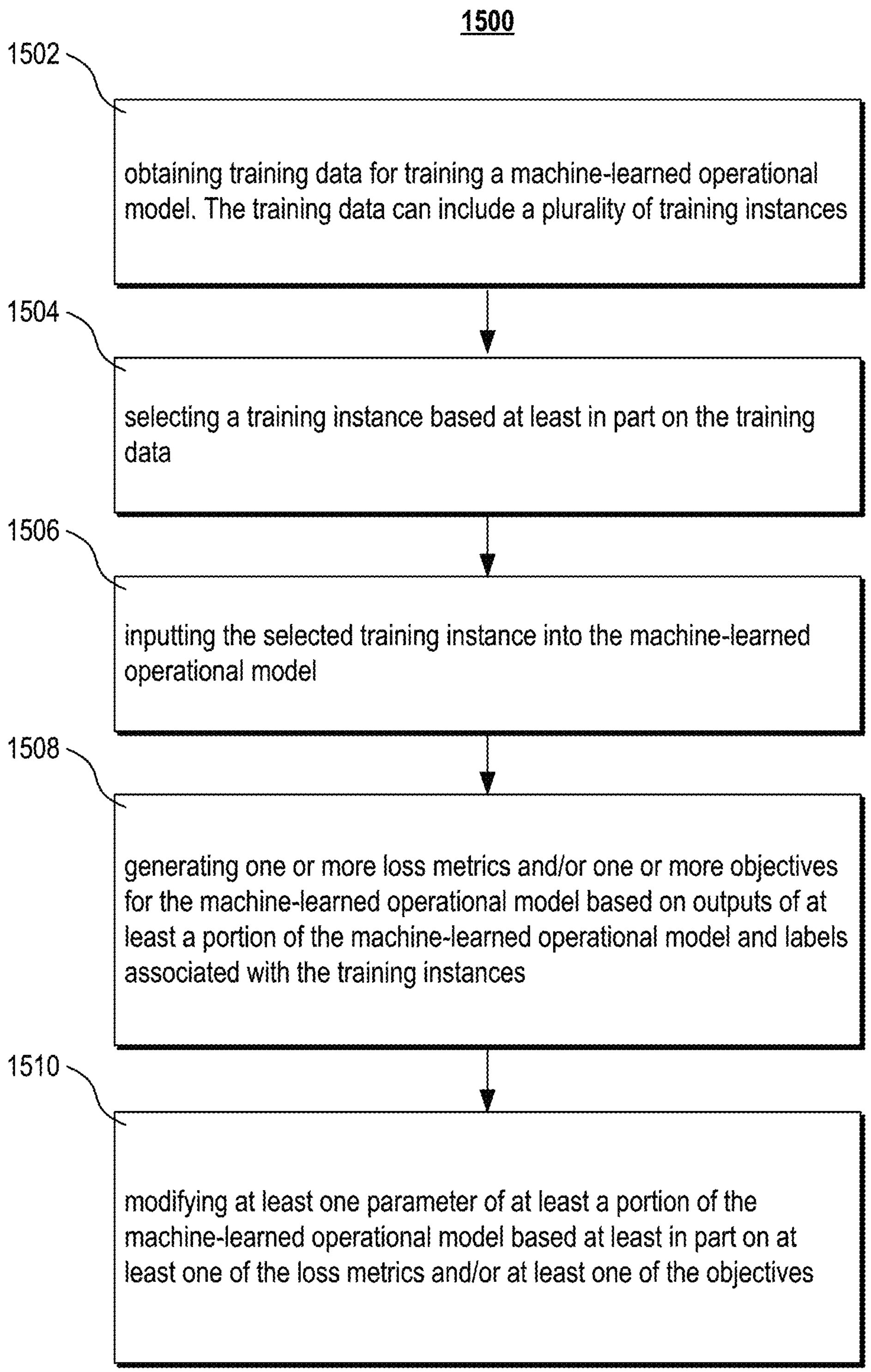
FIG. 15 is a flowchart of an example method for training a machine-learned operational system, according to some implementations of the present disclosure.

FIG. 15 is a flowchart of an example method 1500 for training one or more machine-learned operational models, according to aspects of the present disclosure. For instance, an operational system can include a machine-learned operational model (e.g., one or more of localization system 230, perception system 240, planning system 250, or control system 260).

One or more portions of example method 1500 can be implemented by a computing system that includes one or more computing devices such as, for example, the computing systems described with reference to the other figures (e.g., autonomous platform 110, vehicle computing system 150, remote system 160, first computing system 20, second computing system 40, or any other system described with respect to FIGS. 1 to 16, etc.). Each respective portion of example method 1500 can be performed by any (or any combination) of one or more computing devices. Moreover, one or more portions of example method 1500 can be implemented on the hardware components of the devices described herein (e.g., verification server 404, operator device 406, networks 170, networks 60, computing device(s) 21, computing device(s) 41).

FIG. 15 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 15 is described with reference to elements/terms described with respect to other systems and figures for exemplary illustrated purposes and is not meant to be limiting. One or more portions of example method 1500 can be performed additionally, or alternatively, by other systems.

At 1502, example method 1500 can include obtaining training data for training a machine-learned operational model. The training data can include a plurality of training instances.

The training data can be collected using one or more autonomous platforms (e.g., autonomous platform 110) or the sensors thereof as the autonomous platform is within its environment. By way of example, the training data can be collected using one or more autonomous vehicles (e.g., autonomous platform 110, autonomous vehicle 110, autonomous vehicle 350, etc.) or sensors thereof as the vehicle operates along one or more travel ways. In some examples, the training data can be collected using other sensors, such as mobile-device-based sensors, ground-based sensors, aerial-based sensors, satellite-based sensors, or substantially any sensor interface configured for obtaining and/or recording measured data.

The training data can include a plurality of training sequences divided between multiple datasets (e.g., a training dataset, a validation dataset, or testing dataset). Each training sequence can include a plurality of pre-recorded perception datapoints, point clouds, images, etc. In some implementations, each sequence can include LIDAR point clouds (e.g., collected using LIDAR sensors of an autonomous platform), images (e.g., collected using mono or stereo imaging sensors, etc.), and the like. For instance, in some implementations, a plurality of images can be scaled for training and evaluation.

At 1504, example method 1500 can include selecting a training instance based at least in part on the training data.

At 1506, example method 1500 can include inputting the training instance into the machine-learned operational model.

At 1508, example method 1500 can include generating one or more loss metrics and/or one or more objectives for the machine-learned operational model based on outputs of at least a portion of the machine-learned operational model and labels associated with the training instances.

At 1510, example method 1500 can include modifying at least one parameter of at least a portion of the machine-learned operational model based at least in part on at least one of the loss metrics and/or at least one of the objectives. For example, a computing system can modify at least a portion of the machine-learned operational model based at least in part on at least one of the loss metrics and/or at least one of the objectives.

In some implementations, the machine-learned operational model can be trained in an end-to-end manner. For example, in some implementations, the machine-learned operational model can be fully differentiable.

After being updated, the operational model or the operational system including the operational model can be provided for validation. In some implementations, a validation system can evaluate or validate the operational system. The validation system can trigger retraining, decommissioning, etc. of the operational system based on, for example, failure to satisfy a validation threshold in one or more areas.

Figure 16:
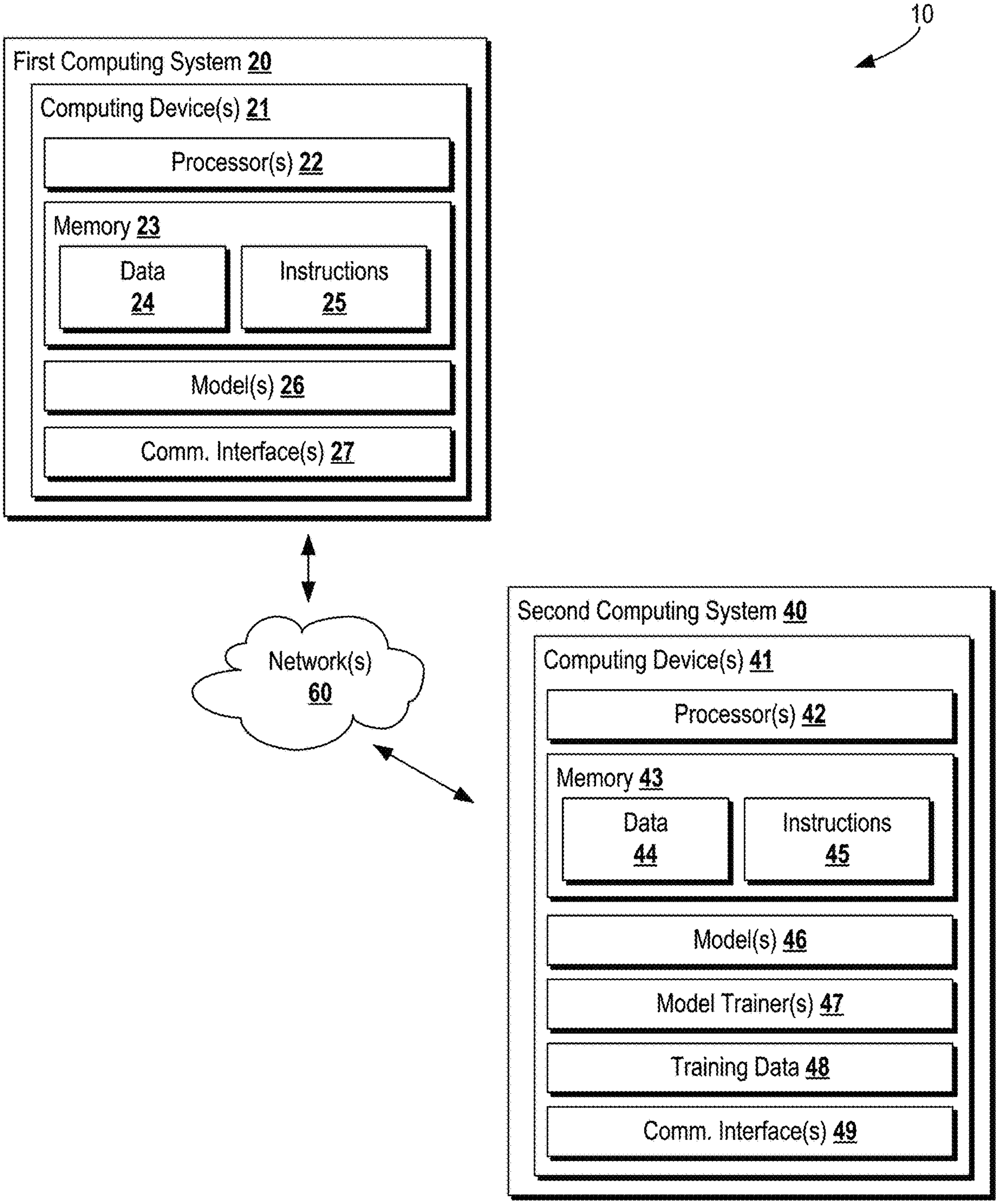
FIG. 16 is a block diagram of an example computing system, according to some implementations of the present disclosure.

FIG. 16 is a block diagram of an example computing ecosystem 10 according to example implementations of the present disclosure. The example computing ecosystem 10 can include a first computing system 20 and a second computing system 40 that are communicatively coupled over one or more networks 60. In some implementations, the first computing system 20 or the second computing 40 can implement one or more of the systems, operations, or functionalities described herein for validating one or more systems or operational systems (e.g., the remote system 160, the onboard computing system 180, the autonomy system 200, etc.).

In some implementations, the first computing system 20 can be included in an autonomous platform and be utilized to perform the functions of an autonomous platform as described herein. For example, the first computing system 20 can be located onboard an autonomous vehicle and implement autonomy system for autonomously operating the autonomous vehicle. In some implementations, the first computing system 20 can represent the entire onboard computing system or a portion thereof (e.g., the localization system 230, the perception system 240, the planning system 250, the control system 260, or a combination thereof, etc.). In other implementations, the first computing system 20 may not be located onboard an autonomous platform. The first computing system 20 can include one or more distinct physical computing devices 21.

The first computing system 20 (e.g., the computing devices 21 thereof) can include one or more processors 22 and a memory 23. The one or more processors 22 can be any suitable processing device (e.g., a processor core, a microprocessor, an ASIC, a FPGA, a controller, a microcontroller, etc.) and can be one processor or a plurality of processors that are operatively connected. Memory 23 can include one or more non-transitory computer-readable storage media, such as RAM, ROM, EEPROM, EPROM, one or more memory devices, flash memory devices, etc., and combinations thereof.

Memory 23 can store information that can be accessed by the one or more processors 22. For instance, the memory 23 (e.g., one or more non-transitory computer-readable storage media, memory devices, etc.) can store data 24 that can be obtained (e.g., received, accessed, written, manipulated, created, generated, stored, pulled, downloaded, etc.). The data 24 can include, for instance, sensor data, map data, data associated with autonomy functions (e.g., data associated with the perception, planning, or control functions), simulation data, or any data or information described herein. In some implementations, the first computing system 20 can obtain data from one or more memory devices that are remote from the first computing system 20.

Memory 23 can store computer-readable instructions 25 that can be executed by the one or more processors 22. Instructions 25 can be software written in any suitable programming language or can be implemented in hardware. Additionally, or alternatively, instructions 25 can be executed in logically or virtually separate threads on the processors 22.

For example, the memory 23 can store instructions 25 that are executable by one or more processors (e.g., by the one or more processors 22, by one or more other processors, etc.) to perform (e.g., with the computing devices 21, the first computing system 20, or other systems having processors executing the instructions) any of the operations, functions, or methods/processes (or portions thereof) described herein. For example, operations can include implementing system validation (e.g., as described herein).

In some implementations, the first computing system 20 can store or include one or more models 26. In some implementations, the models 26 can be or can otherwise include one or more machine-learned models (e.g., a machine-learned operational system, etc.). As examples, the models 26 can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the first computing system 20 can include one or more models for implementing subsystems of the autonomy system 200, including any of: the localization system 230, the perception system 240, the planning system 250, or the control system 260.

In some implementations, the first computing system 20 can obtain the one or more models 26 using communication interface 27 to communicate with the second computing system 40 over the network 60. For instance, the first computing system 20 can store the models 26 (e.g., one or more machine-learned models) in memory 23. The first computing system 20 can then use or otherwise implement the models 26 (e.g., by the processors 22). By way of example, the first computing system 20 can implement the models 26 to localize an autonomous platform in an environment, perceive an autonomous platform's environment or objects therein, plan one or more future states of an autonomous platform for moving through an environment, control an autonomous platform for interacting with an environment, etc.

The second computing system 40 can include one or more computing devices 41. The second computing system 40 can include one or more processors 42 and a memory 43. The one or more processors 42 can be any suitable processing device (e.g., a processor core, a microprocessor, an ASIC, a FPGA, a controller, a microcontroller, etc.) and can be one processor or a plurality of processors that are operatively connected. The memory 43 can include one or more non-transitory computer-readable storage media, such as RAM, ROM, EEPROM, EPROM, one or more memory devices, flash memory devices, etc., and combinations thereof.

Memory 43 can store information that can be accessed by the one or more processors 42. For instance, the memory 43 (e.g., one or more non-transitory computer-readable storage media, memory devices, etc.) can store data 44 that can be obtained. The data 44 can include, for instance, sensor data, model parameters, map data, simulation data, simulated environmental scenes, simulated sensor data, data associated with vehicle trips/services, or any data or information described herein. In some implementations, the second computing system 40 can obtain data from one or more memory devices that are remote from the second computing system 40.

Memory 43 can also store computer-readable instructions 45 that can be executed by the one or more processors 42. The instructions 45 can be software written in any suitable programming language or can be implemented in hardware. Additionally, or alternatively, the instructions 45 can be executed in logically or virtually separate threads on the processors 42.

For example, memory 43 can store instructions 45 that are executable (e.g., by the one or more processors 42, by the one or more processors 22, by one or more other processors, etc.) to perform (e.g., with the computing devices 41, the second computing system 40, or other systems having processors for executing the instructions, such as computing devices 21 or the first computing system 20) any of the operations, functions, or methods/processes described herein. This can include, for example, the functionality of the autonomy system 200 (e.g., localization, perception, planning, control, etc.) or other functionality associated with an autonomous platform (e.g., remote assistance, mapping, fleet management, trip/service assignment and matching, etc.). This can also include, for example, validating a machined-learned operational system.

In some implementations, second computing system 40 can include one or more server computing devices. In the event that the second computing system 40 includes multiple server computing devices, such server computing devices can operate according to various computing architectures, including, for example, sequential computing architectures, parallel computing architectures, or some combination thereof.

Additionally, or alternatively to, the models 26 at the first computing system 20, the second computing system 40 can include one or more models 46. As examples, the models 46 can be or can otherwise include various machine-learned models (e.g., a machine-learned operational system, etc.) such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. For example, the second computing system 40 can include one or more models of the autonomy system 200.

In some implementations, the second computing system 40 or the first computing system 20 can train one or more machine-learned models of the models 26 or the models 46 through the use of one or more model trainers 47 and training data 48. The model trainer 47 can train any one of the models 26 or the models 46 using one or more training or learning algorithms. One example training technique is backwards propagation of errors. In some implementations, the model trainer 47 can perform supervised training techniques using labeled training data. In other implementations, the model trainer 47 can perform unsupervised training techniques using unlabeled training data. In some implementations, the training data 48 can include simulated training data (e.g., training data obtained from simulated scenarios, inputs, configurations, environments, etc.). In some implementations, the second computing system 40 can implement simulations for obtaining the training data 48 or for implementing the model trainer 47 for training or testing the models 26 or the models 46. By way of example, the model trainer 47 can train one or more components of a machine-learned model for the autonomy system 200 through unsupervised training techniques using an objective function (e.g., costs, rewards, metrics, constraints, etc.). In some implementations, the model trainer 47 can perform a number of generalization techniques to improve the generalization capability of the models being trained. Generalization techniques include weight decays, dropouts, or other techniques.

For example, in some implementations, the second computing system 40 can generate training data 48 according to example aspects of the present disclosure. For instance, the second computing system 40 can generate training data 48. For instance, the second computing system 40 can implement methods according to example aspects of the present disclosure. The second computing system 40 can use the training data 48 to train models 26. For example, in some implementations, the first computing system 20 can include a computing system onboard or otherwise associated with a real or simulated autonomous vehicle. In some implementations, models 26 can include perception or machine vision models configured for deployment onboard or in service of a real or simulated autonomous vehicle. In this manner, for instance, the second computing system 40 can provide a training pipeline for training models 26.

The first computing system 20 and the second computing system 40 can each include communication interfaces 27 and 49, respectively. The communication interfaces 27, 49 can be used to communicate with each other or one or more other systems or devices, including systems or devices that are remotely located from the first computing system 20 or the second computing system 40. The communication interfaces 27, 49 can include any circuits, components, software, etc. for communicating with one or more networks (e.g., the network 60). In some implementations, the communication interfaces 27, 49 can include, for example, one or more of a communications controller, receiver, transceiver, transmitter, port, conductors, software or hardware for communicating data.

The network 60 can be any type of network or combination of networks that allows for communication between devices. In some implementations, the network can include one or more of a local area network, wide area network, the Internet, secure network, cellular network, mesh network, peer-to-peer communication link or some combination thereof and can include any number of wired or wireless links. Communication over the network 60 can be accomplished, for instance, through a network interface using any type of protocol, protection scheme, encoding, format, packaging, etc.

FIG. 16 illustrates one example computing ecosystem 10 that can be used to implement the present disclosure. For example, one or more systems or devices of ecosystem 10 can implement any one or more of the systems and components described in the preceding figures. Other systems can be used as well. For example, in some implementations, the first computing system 20 can include the model trainer 47 and the training data 48. In such implementations, the models 26, 46 can be both trained and used locally at the first computing system 20. As another example, in some implementations, the computing system 20 may not be connected to other computing systems. Additionally, components illustrated or discussed as being included in one of the computing systems 20 or 40 can instead be included in another one of the computing systems 20 or 40.

Computing tasks discussed herein as being performed at computing devices remote from the autonomous platform (e.g., autonomous vehicle) can instead be performed at the autonomous platform (e.g., via a vehicle computing system of the autonomous vehicle), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

Aspects of the disclosure have been described in terms of illustrative implementations thereof. Numerous other implementations, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. can be used to illustrate operations. Such identifiers are provided for the ease of the reader and do not denote a particular order of steps or operations. An operation illustrated by a list identifier of (a), (i), etc. can be performed before, after, or in parallel with another operation illustrated by a list identifier of (b), (ii), etc.

The term "can" should be understood as referring to a possibility of a feature in various implementations and not as prescribing an ability that is necessarily present in every implementation. For example, the phrase "X can perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

The term "may" should be understood as referring to a possibility of a feature in various implementations and not as prescribing an ability that is necessarily present in every implementation. For example, the phrase "X may perform Y" should be understood as indicating that, in various implementations, X has the potential to be configured to perform Y, and not as indicating that in every instance X must always be able to perform Y. It should be understood that, in various implementations, X might be unable to perform Y and remain within the scope of the present disclosure.

What is claimed is:

1. A method for initiating an operational state change of an autonomous vehicle to cause the autonomous vehicle to launch a mission, wherein the method comprises:

receiving a request to initiate a computer-controlled operational state of the autonomous vehicle, the request comprising an operational profile identifying (i) the autonomous vehicle, (ii) a route for execution by the autonomous vehicle, (iii) an expected software version, and (iv) an expected map version;

verifying, using a cryptographically signed identifier, an identity of the autonomous vehicle and an authorization status associated with the autonomous vehicle;

verifying that a control subsystem of the autonomous vehicle is configured to execute the software version and that a map subsystem of the autonomous vehicle is configured to execute the map version;

verifying that one or more environmental conditions associated with the route for execution by the autonomous vehicle do not exceed a threshold associated with a baseline performance of at least one of a perception system or a motion planning system of the autonomous vehicle in the one or more environmental conditions;

receiving, from a human-machine interface device, a launch signal input; and transmitting a launch signal to the autonomous vehicle to initiate execution of the route, wherein the launch signal is output responsive to the launch signal input and conditioned on performing the verification of the identity, the verification of the authorization status, the verification of the control subsystem, the verification of the map subsystem, and the verification of the one or more environmental conditions.

2. A computing system for initiating an operational state change of an autonomous vehicle to cause the autonomous vehicle to launch a mission, the computing system comprising:

one or more processors; and one or more non-transitory computer-readable media storing instructions that are executable by the one or more processors to perform operations, wherein the operations comprise:

receiving a request to initiate a computer-controlled operational state of the autonomous vehicle, the request comprising an operational profile identifying (i) the autonomous vehicle, (ii) a route for execution by the autonomous vehicle, (iii) an expected software version, and (iv) an expected map version;

verifying, using a cryptographically signed identifier, an identity of the autonomous vehicle and an authorization status associated with the computer-controlled operational state and the autonomous vehicle;

verifying that a control subsystem of the autonomous vehicle is configured to execute the expected software version and that a map subsystem of the autonomous vehicle is configured to execute the expected map version;

verifying that one or more environmental conditions associated with the route for execution by the autonomous vehicle do not exceed a threshold associated with a baseline performance of at least one of a perception system or a motion planning system of the autonomous vehicle in the one or more environmental conditions;

receiving, from a human-machine interface device, a launch signal input; and transmitting a launch signal to the autonomous vehicle to initiate the computer-controlled operational state, wherein the launch signal is output responsive to the launch signal input and conditioned on successfully performing the verification of the identity, the verification of the authorization status, the verification of the control subsystem, the verification of the map subsystem, and the verification of the one or more environmental conditions.

3. The computing system of claim 2, wherein:

the human-machine interface device is external to the autonomous vehicle.

4. The computing system of claim 2, wherein:

the human-machine interface device is located at a first location; and the autonomous vehicle is launched from a launch pad at a second location that is different from the first location.

5. The computing system of claim 4, wherein the operations comprise:

determining a location of the autonomous vehicle;

wherein the launch signal is conditioned on the location of the autonomous vehicle being a designated launch location.

6. The computing system of claim 2, wherein the operations comprise:

updating, in association with the launch signal input, an authentication status of a user of the human-machine interface device.

7. The computing system of claim 6, wherein updating the authentication status comprises:

requesting, from the human-machine interface device, an authentication credential.

8. The computing system of claim 7, wherein the authentication credential is an additional authentication credential different from an initial authentication credential used to initiate a user session on the human-machine interface device.

9. The computing system of claim 7, wherein the authentication credential is based on a physical passkey.

10. The computing system of claim 2, wherein the operations comprise:

obtaining, from the autonomous vehicle, sensor calibration data; and determining, based on the sensor calibration data, a calibration status of a component of the control subsystem.

11. The computing system of claim 10, wherein:

the component is a perception system of the autonomous vehicle; and the sensor calibration data comprises test detections obtained by the autonomous vehicle of one or more calibration objects during a calibration routine.

12. The computing system of claim 11, wherein the calibration routine comprises:

causing the autonomous vehicle to move with respect to the one or more calibration objects;

recording perception data descriptive of the one or more calibration objects using the perception system; and comparing the recorded perception data against reference data descriptive of the one or more calibration objects.

13. The computing system of claim 10, wherein:

the component is a localization system of the autonomous vehicle;

the sensor calibration data comprises pose data obtained by the autonomous vehicle; and the operations comprise:

causing the autonomous vehicle to move within a calibration environment;

localizing the autonomous vehicle within a map of the calibration environment using the localization system; and comparing the localization of the autonomous vehicle within the map against reference data descriptive of a reference location of the autonomous vehicle within the calibration environment.

14. The computing system of claim 2, wherein the operations comprise:

verifying that the one or more environmental conditions associated with the route for execution by the autonomous vehicle do not exceed the threshold associated with the baseline performance of the perception system. verifying that the one or more environmental conditions do not exceed a vehicle capability.

15. The computing system of claim 2, wherein the one or more environmental conditions comprise:

a weather condition along the route;

a traffic condition along the route; or an infrastructure condition along the route.

16. The computing system of claim 2, wherein the one or more environmental conditions include a predicted environmental condition at a future time.

17. The computing system of claim 2, wherein the operations comprise:

verifying that the one or more environmental conditions associated with the route for execution by the autonomous vehicle do not exceed the threshold associated with the baseline performance of the motion planning system.

18. The computing system of claim 2, the operations comprising:

verifying that the one or more environmental conditions do not exceed a regulatory restriction on autonomous vehicle operation in the one or more environmental conditions.

19. A computing system for verifying operational state changes of an autonomous vehicle to cause the autonomous vehicle to launch a mission, the computing system comprising:

one or more processors; and one or more non-transitory, computer-readable media storing instructions that are executable by the one or more processors to perform operations, wherein the operations comprise:

outputting a request to initiate a computer-controlled operational state of the autonomous vehicle, the request comprising an operational profile identifying (i) the autonomous vehicle, (ii) a route for execution by the autonomous vehicle, (iii) an expected software version, and (iv) an expected map version;

receiving data describing a first human-machine interface ("HMI") input confirming a configuration of the autonomous vehicle, the first HMI input associated with the request;

receiving automated verification data from an automated verification system conditioned on verification, using a cryptographically signed identifier, of an identity of the autonomous vehicle and an authorization status associated with the computer-controlled operational state and the autonomous vehicle, verification that a control subsystem of the autonomous vehicle is configured to execute the expected software version and that a map subsystem of the autonomous vehicle is configured to execute the expected map version, and verification that one or more environmental conditions associated with the route for execution by the autonomous vehicle do not exceed a threshold associated with a baseline performance of at least one of a perception system or a motion planning system of the autonomous vehicle in the one or more environmental conditions-satisfy one or more criteria;

rendering a confirmation indicator associated with verification of an autonomous control system of the autonomous vehicle and verification of the route for execution by the autonomous vehicle using the autonomous control system; and generating a launch signal input that is conditioned on the first HMI input and the automated verification data, wherein generating the launch signal input comprises:

receiving data describing a second HMI input;

responsive to the second HMI input, updating an authentication status of a user associated with the second HMI input; and outputting the launch signal input;

wherein the launch signal input is configured for transmission to a launch system to initiate the computer-controlled operational state.

20. The computing system of claim 19, wherein the second HMI input is received from an HMI that is external to the autonomous vehicle.

21. The computing system of claim 20, wherein the first HMI input is received from a different HMI from the second HMI input.

22. The computing system of claim 19, wherein:

the launch of the autonomous vehicle is associated with a designated launch location; and the second HMI input is received from a second HMI in a designated control station at a second location that is different from the designated launch location.

23. The computing system of claim 22, wherein the first HMI input is received from a first HMI integrated into a mobile device.

24. The computing system of claim 19, wherein the operations comprise determining an initial authentication status of the user; and based on the initial authentication status, performing the outputting of the request.

25. The computing system of claim 24, wherein updating the authentication status of the user comprises:

verifying an authentication credential associated with the computing system.

26. The computing system of claim 24, wherein updating the authentication status of the user comprises:

using a passkey to authenticate a user account associated with the second HMI input.

27. The computing system of claim 26, wherein the passkey comprises:

a physical passkey; or a biometric-based passkey.

* * * * *